US006506401B1

(12) United States Patent
Rothamel et al.

(10) Patent No.: US 6,506,401 B1
(45) Date of Patent: Jan. 14, 2003

(54) FILLED EDIBLE PRODUCT, AND SYSTEM AND METHOD FOR PRODUCTION OF A FILLED EDIBLE PRODUCT

(75) Inventors: Richard J. Rothamel, Lakewood, CA (US); Lawrence Hawley, Huntington Beach, CA (US); Donald Barnvos, Huntington Beach, CA (US); Davor Juravic, San Pedro, CA (US); Jeffrey Rabe, Huntington Beach, CA (US); Bill Keehn, Perry, KS (US); Steven Bautista, Long Beach, CA (US)

(73) Assignee: H. J. Heinz Company, Pittsburgh, PA (US)

( * ) Notice: Subject to any disclaimer, the term of this patent is extended or adjusted under 35 U.S.C. 154(b) by 0 days.

(21) Appl. No.: 09/238,415

(22) Filed: Jan. 28, 1999

(51) Int. Cl.$^7$ .............................. A23K 1/13; A23K 1/20; A23P 1/08; A23P 1/12; A61K 47/00
(52) U.S. Cl. ...................... 424/439; 424/442; 426/805; 426/282; 426/512; 426/516; 264/510; 264/514
(58) Field of Search ................................ 426/805, 282, 426/512, 516; 264/510, 514; 424/442, 439

(56) References Cited

U.S. PATENT DOCUMENTS

| 1,116,408 A | 11/1914 | Gaebel |
| 1,572,071 A | 2/1926 | Laskey |

(List continued on next page.)

FOREIGN PATENT DOCUMENTS

| EP | 0 088 574 | | 9/1983 |
| EP | 178878 | * | 4/1986 |
| EP | 0 862 863 | | 9/1998 |
| JP | 59-51692 A | | 3/1984 |
| JP | 59-200296 A | | 11/1984 |
| WO | 96/39869 | | 12/1996 |

OTHER PUBLICATIONS

KAT–A–LAX* Feline Laxative, Veterinary Specialties, Mar. 6, 1998, See: p. 1.*

(List continued on next page.)

*Primary Examiner*—Frederick Krass
*Assistant Examiner*—Clinton Ostrup
(74) *Attorney, Agent, or Firm*—Burns, Doane, Swecker & Mathis, L.L.P.

(57) ABSTRACT

An edible product in accordance with the present invention involves an edible inner component made from a first material and an edible outer cover component substantially completely encapsulating the edible inner component. In one form of the invention, the inner component is in the form of a hairball treatment for cats and the outer component is a dough-like material. A system for producing the edible product includes a first material source for supplying a first edible material to form the inner component of the edible product, a second material source for supplying a second edible material to form the outer component of the edible product, and an extruder for continuously coextruding the first edible material and the edible second material to produce an elongated rope of edible product. A crimping apparatus receives the longitudinal rope extruded from the extruder for crimping the longitudinal rope to separate the longitudinal rope into individual edible products. A method for producing the edible product involves supplying the first and second edible materials to the extruder, and continuously coextruding the first and second materials as a longitudinal rope in which the first material is positioned within and surrounded by the second material. The longitudinal rope is cut at spaced apart locations as it is being extruded from the extruder to produce individual edible products each containing an inner component comprised of the first material and an outer cover component comprised of the second material that substantially completely surrounds the inner component, with the edible products being sealed at opposite ends.

28 Claims, 18 Drawing Sheets

U.S. PATENT DOCUMENTS

| | | |
|---|---|---|
| 1,610,295 A | 12/1926 | Latham |
| 1,751,430 A | 3/1930 | Thomson |
| 1,753,834 A | 4/1930 | Pönisch |
| 2,248,291 A | 7/1941 | Walborn |
| 2,714,861 A | 8/1955 | Castronuovo |
| 3,113,030 A | 12/1963 | Brody |
| 3,119,691 A | 1/1964 | Ludington et al. |
| 3,139,342 A | 6/1964 | Linskey |
| 3,269,088 A | 8/1966 | Kath |
| 3,284,211 A | 11/1966 | Williams |
| 3,379,142 A | 4/1968 | Reiter et al. |
| 3,447,929 A | 6/1969 | Hale |
| 3,597,516 A | 8/1971 | Harwood |
| 3,645,747 A | 2/1972 | Palmer |
| 3,679,429 A | 7/1972 | Muhrman et al. |
| 3,808,340 A | 4/1974 | Palmer |
| 3,808,341 A | 4/1974 | Rongey et al. |
| 3,916,029 A | 10/1975 | Hildebolt |
| 3,922,353 A | 11/1975 | Bernotavicz |
| 4,006,266 A | 2/1977 | Bone et al. |
| 4,025,260 A | 5/1977 | Neel |
| 4,029,823 A | 6/1977 | Bone et al. |
| 4,032,665 A | 6/1977 | Miller et al. |
| 4,072,551 A | 2/1978 | Dabal et al. |
| 4,162,333 A | 7/1979 | Nelson et al. |
| 4,163,065 A | 7/1979 | Cilek |
| 4,190,679 A | 2/1980 | Coffee et al. |
| D254,337 S | 3/1980 | Miller et al. |
| 4,209,536 A | 6/1980 | Dogliotti |
| 4,220,152 A | 9/1980 | Dresback |
| 4,259,315 A | 3/1981 | Lippmann et al. |
| 4,260,635 A | 4/1981 | Fisher |
| 4,273,788 A | 6/1981 | Bone et al. |
| 4,364,925 A | 12/1982 | Fisher |
| 4,398,881 A | 8/1983 | Kobayashi |
| 4,407,830 A | 10/1983 | Matthews et al. |
| 4,503,080 A | 3/1985 | Brabbs et al. |
| 4,508,741 A | 4/1985 | Corbett et al. |
| 4,569,848 A | 2/1986 | Giorgetti et al. |
| 4,574,690 A | 3/1986 | Chiao et al. |
| 4,579,741 A | 4/1986 | Hanson et al. |
| 4,610,884 A | 9/1986 | Lewis, III et al. |
| 4,752,484 A | 6/1988 | Pflaumer et al. |
| 4,762,723 A | 8/1988 | Strong |
| 4,777,058 A | 10/1988 | Chandler et al. |
| 4,784,860 A | 11/1988 | Christensen et al. |
| 4,795,655 A | 1/1989 | Spiel et al. |
| 4,847,098 A | 7/1989 | Langler |
| 4,853,236 A | 8/1989 | Langler |
| 4,857,333 A | 8/1989 | Harold |
| 4,873,096 A | 10/1989 | Spiel et al. |
| 4,900,572 A | 2/1990 | Repholz et al. |
| 4,904,495 A | 2/1990 | Spanier |
| 4,997,671 A | 3/1991 | Spanier |
| 5,194,283 A | 3/1993 | Dupas et al. |
| 5,200,212 A | 4/1993 | Axelrod |
| 5,208,059 A | 5/1993 | Dubowik et al. |
| 5,223,292 A | 6/1993 | Thulin et al. |
| 5,270,064 A * | 12/1993 | Shultz .......................... 426/90 |
| 5,342,188 A | 8/1994 | Zimmermann |
| 5,435,714 A | 7/1995 | Van Lengerich et al. |
| 5,449,281 A | 9/1995 | Dupart et al. |
| 5,587,193 A * | 12/1996 | Kazemzadeh ............... 426/448 |
| 5,635,237 A | 6/1997 | Greenberg et al. |
| 5,641,529 A | 6/1997 | Kunas |
| 5,643,623 A | 7/1997 | Schmitz et al. |
| 5,695,797 A | 12/1997 | Geromini et al. |
| 5,731,029 A | 3/1998 | Karwowski et al. |
| 5,895,662 A | 4/1999 | Meyer |
| 5,919,451 A | 7/1999 | Cook et al. |
| 6,080,403 A * | 6/2000 | Shields, Jr. et al. ...... 424/94.65 |
| 6,117,477 A * | 9/2000 | Paluch ........................ 426/623 |

OTHER PUBLICATIONS

Medical Information, Vomiting, Reasons, 1997, p. 9.*
http://www.klasje.si/oklasju–en.htm. Klasje web page printout.
http://www.fancyfoodshows.com. NASFT Fancy Food Shows web page printout.
*The Manufacturing Confectioner*, vol. 69, No. 1, pp. 65–69, Oct. 1989.
*Food Engineering*, vol. 65, No. 10, pp. 32–33, Oct. 1993.
K. Lorenz, "Fats and Oils in Cookies," *Cookie Chemistry and Technology*, pp. 120–128.
T. Lehmann et al., Technological Processes and Problems in Cookie Production, *Cookie Chemistry and Technology*, pp. 280–292.
N. Moreth, "Engineering and Processing—Co–Extrusion," *Cookie Chemistry and Technology*, pp. 326, 406–414.
*Baking & Snack*, vol. 16, No. 1, pp. 49–51, Jan. 1994.
G. Moore, "Co–extrusion," *APV Extruded/Filled Snacks Production Systems*, pp. 34–40, AACC Short Course on Food Extrusion, Mar. 1994.
"New Process from APV," *Confectionary Productions*, p. 697, Sep. 1995.
APV Budget Quotation; Reference No. CCB960DD4, pp. 1, 7–8, 1/96.
"APV Baker—Increasing the Scope for Biscuit and Cereal Bar Production," *Kennedy's Confection*, vol. 3, No. 11, p. 33, Nov. 1996.
M.S. Starer, "When to Consider a Twin–Screw Extruder for Making Pet Food," *Cereal Foods World*, 1996 AACC Annual Meeting Highlights, vol. 41, No. 11, pp. 822–824, Nov.–Dec. 1996.

* cited by examiner

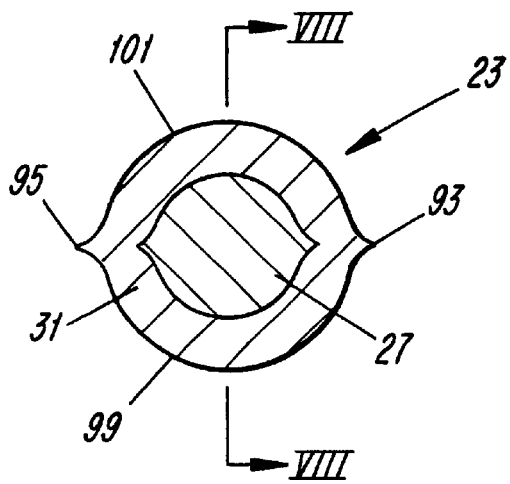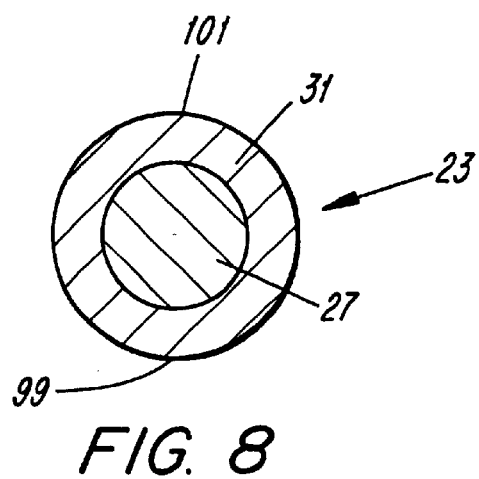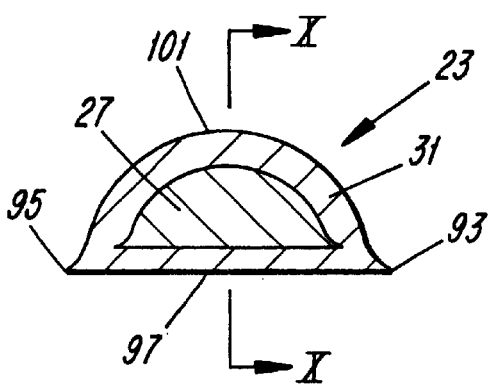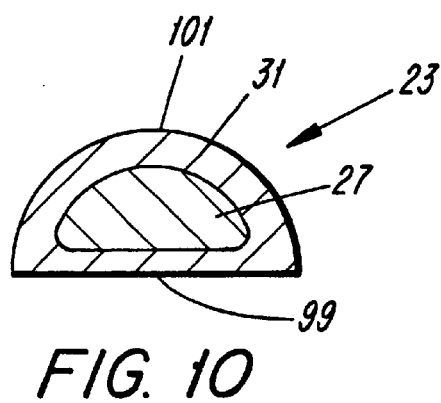

| FORMULAS AND RANGES FOR DOUGH-LIKE OUTER MATERIAL | | | | | | | |
|---|---|---|---|---|---|---|---|
| INGREDIENT | A | B | C | D | E | F | RANGES |
| SOY FLOUR | 31.46000% | 12.0000% | 7.00000% | 18.32320% | 15.82320% | 12.2236% | 7-40% |
| DRIED EGG | 0.00000% | 4.4500% | 0.00000% | 0.00000% | | 4.45000% | 0-9% |
| WHEAT GLUTEN | 0.00000% | 0.0000% | 0.00000% | 3.50000% | 3.00000% | 0.00000% | 0-3.5% |
| PREGEL WHEAT FLOUR | 0.00000% | 17.3000% | 15.00000% | 0.00000% | | 17.30000% | 0-17.3% |
| DRIED CHEDDAR CHEESE | 0.00000% | 1.1000% | 0.00000% | | | 1.10000% | 0-1.11% |
| TORULA YEAST | 0.00000% | 4.1700% | 0.00000% | | | 4.17000% | 0-4.17% |
| CHICKEN SKIN MEAL | 0.00000% | 4.4300% | 0.00000% | | | 4.43000% | 0-4.43% |
| WHEAT FEED FLOUR, HARD | 26.42300% | 15.5501% | 21.36510% | 19.57320% | 10.92850% | 15.22914% | 10.9-26.4% |
| BONE PHOSPHATE | 0.00000% | 0.0000% | 0.00000% | 0.50000% | 0.50000% | 0.00000% | 0-0.5% |
| CALCIUM SULFATE | 0.08000% | 0.0745% | 0.07450% | 0.08000% | 0.08000% | 0.07450% | 0.0745-.008% |
| POTASSIUM CHLORIDE | 0.78100% | 0.7278% | 0.72780% | 0.78100% | 0.78100% | 0.72780% | 0.0727-0.0781% |
| SALT | 2.62000% | 1.5000% | 1.50000% | 1.25000% | 1.25000% | 1.50000% | 1.25-2.62% |
| TITANIUM DIOXIDE | 0.23000% | 0.2143% | 0.21430% | 0.23000% | 0.23000% | 0.21430% | 0-0.23 |
| CORN STARCH | 0.00000% | 0.0000% | 0.00000% | 7.00000% | 6.50000% | 0.00000% | 0-7 |
| RED 40 | 0.01000% | 0.0093% | 0.00930% | 0.01000% | 0.01000% | 0.00930% | 0-.-0.01 |
| SORBIC ACID | 0.15000% | 0.3000% | 0.30000% | 0.35000% | 0.35000% | 0.00000% | 0-0.35 |
| CRYSTALLINE FRUCTOSE | 0.00000% | 6.5000% | 6.50000% | | | 6.50000% | 0-6.5 |
| SUGAR | | 4.0000% | 6.00000% | 5.00000% | 5.00000% | 4.00000% | 0-6 |
| SOY PROTEIN CONCENTRATE | 0.00000% | | 5.00000% | | 3.98830% | 0.00000% | 0-5 |
| PATENT FLOUR WHEAT | 0.00000% | | | 7.00000% | 4.00000% | 0.00000% | 0-7 |
| POTASSIUM SORBATE | 0.00000% | | 0.00000% | | | 0.40190% | 0-0.4019 |
| BHA, 99% CONCENTRATE | 0.00630% | 0.0090% | 0.00900% | 0.00900% | 0.00900% | 0.00446% | .00446-.009 |
| MEATS AND LIQUIDS | | | | | | | |
| BEEF | | 7.0000% | 0.00000% | 18.35530% | | 7.00000% | 0-18.3 |
| LIQUID DIGEST | | | 30.00000% | 1.00000% | 35.00000% | 0.00000% | 0-30 |
| MALT SYRUP | 7.81800% | | 0.00000% | | | 0.00000% | 0-8.6 |
| WATER | 20.95300% | 14.3650% | 0.00000% | 4.48830% | | 13.66500% | 0-21 |
| CORN SYRUP | 4.81800% | | | 8.75000% | 8.75000% | 0.00000% | 0-8.6 |
| GLYCERINE | 3.45070% | 6.0000% | 6.00000% | 3.00000% | 3.00000% | 6.00000% | 3-6 |
| ANIMAL FAT, GREASE | 0.00000% | 0.0000% | 0.00000% | 0.50000% | 0.50000% | 0.00000% | 0-0.3.5 |
| PHOSPHORIC ACID, 75% | 1.20000% | 0.3000% | 0.30000% | 0.30000% | 0.30000% | 1.00000% | 0.3-1.2 |
| | 100.00000% | 100.0000% | 100.00000% | 100.00000% | 100.00000% | 100.00000% | |

FIG. 22

| FORMULAS AND RANGES FOR INNER EMULSION MATERIAL |||
|---|---|---|
| EMULSION | A | RANGES |
| MALT SYRUP | 46.7000% | 45-55 |
| SALT | 0.1500% | 0-0.15 |
| PETROLEUM JELLY | 0.0000% | 0-100 |
| WATER | 3.0000% | 0-10 |
| GLYCERINE | 0.0000% | 0-7 |
| CARBOXYMETHYL CELLULOSE | 1.0000% | 0-2 |
| LIQUID DIGEST | 0.0000% | 0-2 |
| POTASSIUM SORBATE | 0.1500% | 0-0.3 |
| CAT PALATABILITY ENHANCER | 1.0000% | 0-1 |
| ACACIA GUM | 2.000% | 0-2 |
| CHICKEN STOCK | 2.000% | 0-2 |
| MINERAL OIL | 44.0000% | 0-54 |
|  | 100.0000% |  |

FIG. 23

FILLED EDIBLE PRODUCT, AND SYSTEM AND METHOD FOR PRODUCTION OF A FILLED EDIBLE PRODUCT

FIELD OF THE INVENTION

The present invention generally relates to a filled edible product, and an apparatus and method for producing such a product. More particularly, the present invention pertains to a filled edible product comprised of an inner component, such as a gel medicament, substantially completely surrounded by and enclosed within an outer component having crimped ends, and an apparatus and method for making such a filled product.

BACKGROUND OF THE INVENTION

Certain pet medications, such as hairball treatment medications for cats, are commonly available. Hairball treatment medications in particular typically are in the form of emulsions of either mineral oil (liquid petrolatum) or petroleum jelly (white petrolatum). Malt extract (malt syrup) is typically used as a palatant and also is the base from which the emulsion is formed. Depending on the particular type of product, acacia gum (gum arabic), lecithin, fatty acids and glyceride are used as the emulsifiers. Some products also include vitamin supplements and possibly also preservatives to control mold growth.

Some known hairball treatment products are in gel form and are packaged in a tube. The pet's owner administers the gel by squeezing the desired amount of the gel onto the cat's front paws or nose, with the hope that the cat will then lick and ingest the gel. An alternative way of administering this type of tube packaged product is to squeeze a ribbon forming the desired amount of gel onto one's fingers and feeding the gel to the cat.

Another known hairball treatment is packaged in a stick form. In this alternative approach, the product is adapted to be administered by turning a dial on the stick to cause a desired amount of the product to be exposed. The product can then be rubbed on the cat's paws, rubbed on one's finger and fed to the cat, or simply given to the cat to lick directly from the stick.

In all of these various known hairball treatment products, the administration of the hairball treatment is rather messy and may not always be effective from the standpoint of the cat actually ingesting the medication.

In light of the foregoing, a need exists for a different way of administering pet medicaments, such as hairball treatment formulas, that does not suffer from the same disadvantages and drawbacks as other known products.

A need also exists for a method of producing such a product in a way that lends itself to high speed, high output production so that production of the product on a commercial scale is possible.

It would also be desirable to provide an edible pet product containing edible foods other than pet medicaments, as well as an apparatus and method for making such a product.

SUMMARY OF THE INVENTION

One aspect of the present invention involves a system for producing an edible product that includes an edible inner component made from a first material and an edible outer cover component substantially completely encapsulating the edible inner component. The system includes a first material source for supplying a first edible material, a second material source for supplying a second edible material, and an extruder for continuously coextruding the first edible material and the second material to produce an elongated rope of edible product. The extruder includes a manifold having a first conduit connected to the first material source and a second conduit connected to the second material source, with the first conduit being positioned within the second conduit to produce during coextrusion a continuous longitudinal rope comprised of the first edible material surrounded by the second edible material. A crimping apparatus receives the longitudinal rope extruded from the extruder for crimping the longitudinal rope to separate the longitudinal rope into individual edible products. The crimping apparatus includes a first movable member and an opposing second movable member, with the first and second movable members being connected to a drive source for moving the first and second movable members. The first movable member has a plurality of protruding crimping elements positioned to define compression points with the second movable member as the crimping elements move into confronting relation with the second movable member during movement of the first and second movable members. The first and second movable members move at the same speed and in the same direction at the compression point, and the longitudinal rope is received in the compression point with the longitudinal rope being compressed between the crimping element and the second movable member to separate the longitudinal rope into a plurality of individual edible products.

According to another aspect of the present invention, an edible product includes a first material in the form of a hairball treatment formulation, and a second cover material surrounding the first material to encapsulate the hairball treatment formulation.

Another aspect of the present invention involves a method for producing an edible product that includes supplying a first edible material to an extruder, supplying a second edible material to the extruder, and continuously coextruding the first and second materials as a longitudinal rope in which the first material is positioned within and surrounded by the second material. The longitudinal rope is cut at spaced apart locations as it is being extruded from the extruder to produce individual edible products each containing an inner component comprised of the first material and an outer cover component comprised of the second material that substantially completely surrounds the inner component, with the edible products being sealed at opposite ends.

In accordance with a further aspect of the present invention, an edible product includes a semi-fluid edible inner component, and an edible outer cover component that substantially completely encapsulates the inner component, with the outer component being more viscous than the inner cover component, and the outer component being sealed along seal areas at two opposite ends.

BRIEF DESCRIPTION OF THE DRAWING FIGURES

The foregoing and additional features and characteristics associated with the present invention will become more apparent from the following detailed description considered in conjunction with the accompanying drawing figures in which like reference numerals indicate like elements and wherein:

FIG. 6 is an end view of the manifold shown in FIG. 2 as seen from the nozzle end of the manifold;

FIG. 7 is a cross-sectional view of one form of the edible product in accordance with the present invention;

FIG. 8 is a cross-sectional view of the edible product shown in FIG. 7 taken along the section line VIII—VIII;

FIG. 9 is a cross-sectional view of a second embodiment of an edible product according to the present invention;

FIG. 10 is a cross-sectional view of the food product shown in FIG. 9 taken along the section line X—X in FIG. 9;

FIG. 22 is a table listing ingredients and ranges of ingredients constituting various formulations for the dough-like material forming the outer component of the edible product of the present invention;

FIG. 23 is a table listing ingredients and ranges of ingredients constituting formulations for the emulsion forming the inner component of the edible product of the present invention;

DETAILED Description OF THE INVENTION

Generally speaking, the present invention pertains to an edible food product, as well as a method and apparatus for making such a product. The edible product is comprised of an edible inner component that is substantially completely surrounded by an edible outer cover. One preferred form of the edible product is a pet treat, with the edible inner component being in the form of a pet medication such as a hairball treatment formulation and the edible outer cover being a dough type of product, possibly also coated, that is palatable to the pet. The method and apparatus for manufacturing the edible product generally involves continuously coextruding the inner food component, which is fluid or semi-fluid in nature (i.e., fluid enough to flow under pressure) and in the form of an emulsion, and the outer cover component, which is in the form of a dough-type material. The edible outer component is more viscous than the edible inner component. The two components are continuously coextruded in the form of a rope which is then cut into individual pieces to produce the edible product. The method and apparatus are particularly well suited to high speed production permitting high volume output of the edible product (e.g., 250,000–500,000 pieces/hr. or 500–1,000 lbs./hr.) on a scale necessary for commercial production.

FIGS. 7–10 illustrate two different versions of the edible product produced in accordance with the present invention. As seen in FIGS. 7–10, the edible product 23 includes an inner component or portion 27 made from a first edible material and an outer cover component or portion 31 made from a second edible material. The outer cover portion 31 completely surrounds the inner portion 27. In accordance with a preferred embodiment of the present invention, the edible product 23 is a cat treat that is particularly adapted as a cat hairball treatment. Thus, the formulations of the inner and outer components forming the edible product, and the apparatus and method used to produce the edible product are described in the context of a cat treat that is particularly adapted for hairball treatment. However, it is to be understood that the apparatus and method are useful in the manufacture of other edible products in which an inner component is entirely surrounded by and enclosed within an outer cover component.

Figure 1:
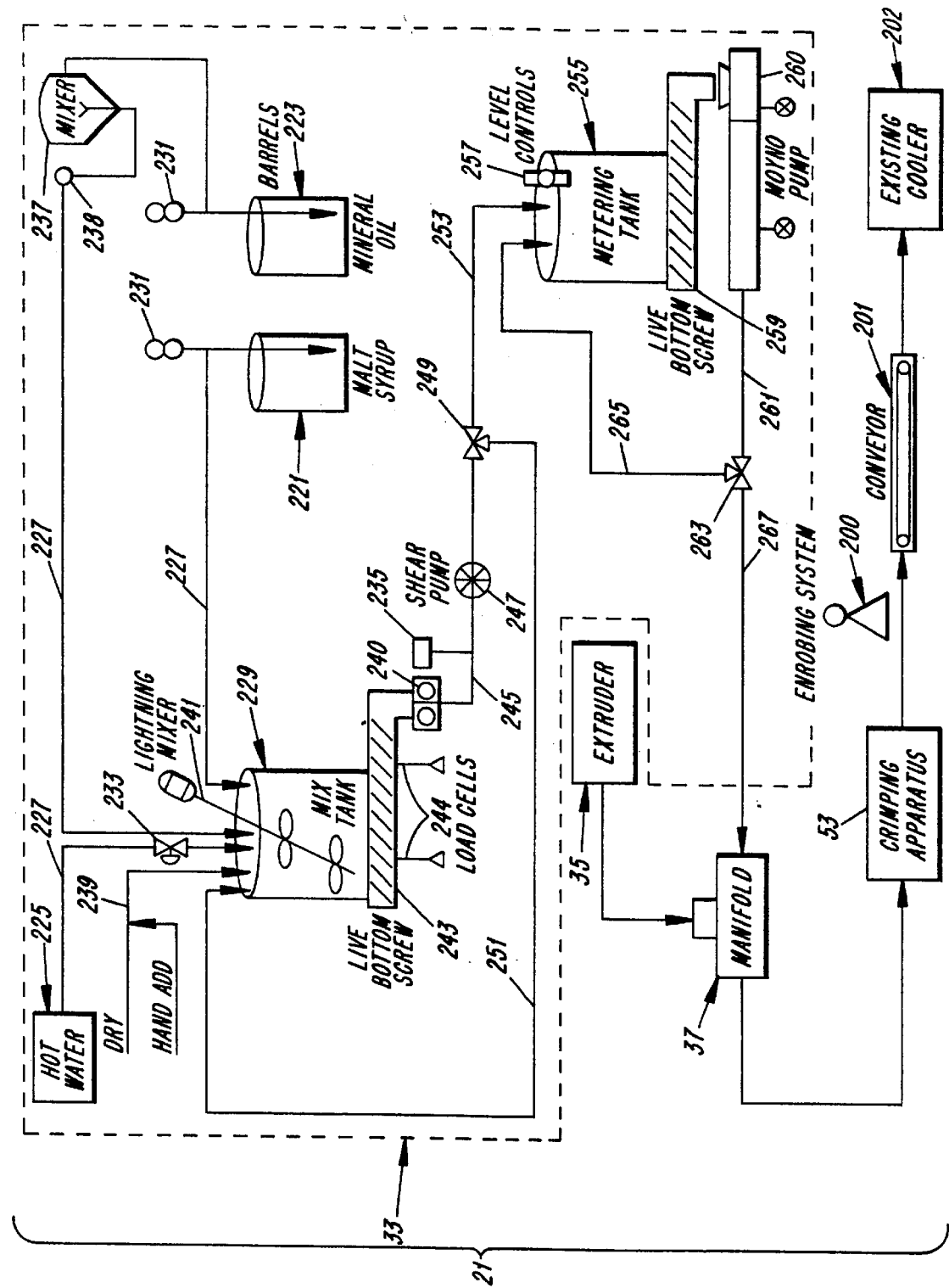
FIG. 1 is a schematic illustration of a system for producing an edible product according to an embodiment of the present invention.

An overall system for mixing the ingredients necessary to make the edible inner component, for mixing the ingredients necessary to make the edible outer cover component, for continuously coextruding the two components as a rope, and for dividing the rope into individual edible pieces is generally shown in FIG. 1. The system of the present invention for producing edible products having an edible inner component and an edible outer cover component is designed so that the mixing of the ingredients necessary for preparing the edible inner component is performed separate from the mixing of the ingredients necessary for preparing the outer cover component. As seen in FIG. 1, the overall system according to the present invention for producing the edible product includes a first material source 33 for preparing and supplying the inner component 27 of the edible product and a second material source 35 for preparing and supplying the outer cover component 31 of the edible product.

The first source 33 is designed to produce and supply the inner component of the edible product in the form of an emulsion. As shown in FIG. 1, the first source 33 preferably includes a supply reservoir 221 of malt syrup, a supply reservoir 223 of mineral oil or petroleum jelly, and a supply 225 of water which is preferably hot, but could be cold. Respective conduits 227 extend from each of the supplies 221, 225 to a mixing tank 229. Pumps 231 may be provided as desired or necessary to supply the liquid ingredients to the mixing tank 229. The liquid components can also be gravity fed or maintained under pressure, such as the ordinary pressure of a water supply line. A valve 233 is preferably located along the conduit 227 connecting the water source 225 to the mixing tank to control the rate of water flow into the mixing tank 229 and to turn off the hot water supply. Similar valves can also be provided between the other material sources 221, 223 and the mixing tank for a similar purpose. It has been found that the addition of water by hand is acceptable, and the other liquid ingredients could be added in a similar manner. Also, the addition of the liquid ingredients can be automated.

The malt syrup source 221 is preferably preheated by placing the container containing the malt syrup into a hot box or oven. The mineral oil source or petroleum jelly source 223 is preferably preheated by being pumped to a high speed mixer 237 such as a Breddo mixer. The mixing action of the high speed mixer 237 heats the mineral oil or petroleum jelly. The preheated mineral oil/petroleum jelly is then pumped by a pump 238 to the mixing tank 229 by way of a conduit 227. In the alternative, the malt syrup and mineral oil/petroleum jelly can be preheated by using heating coils, steam injectors. A high speed mixer similar to that used with the mineral oil/petroleum jelly source can also be used to preheat the malt syrup source.

The mixing tank 229 can be positioned on several load cells 244 which are able to sense the weight of the oil and syrup in the mixing tank 229. When the load cells 244 sense that the weight of oil and syrup in the mixing tank has reached a predetermined value indicative of the necessary amount of oil and syrup for mixing a batch of emulsion, the pumps 231 controlling the flow of oil and syrup are turned off.

The ingredients are preferably added to the mixing tank 229 one at a time. The system can be designed to maintain an ongoing weight total of ingredients in the tank 229, so that once the addition of an ingredient has been completed, the system determines the total weight of ingredients in a batch. By programming the system to add specified amounts (e.g., weights) of the various ingredients, the system can then determine when the specified amount of an ingredient has been added by monitoring the total weight measured by the load cells 244.

The other ingredients added to the mixing tank 229 are generally depicted as a source 239 in FIG. 1 and constitute dry ingredients. These dry ingredients are preferably hand added, although other mechanisms can be employed to add these ingredients. The dry ingredients may include gums, preservatives, salts, palatants and humectants. The mixing tank 229 is outfitted with a propellor or lightening mixer 241, or other appropriate agitation device, for mixing the malt syrup, the mineral oil, the hot water and the dry ingredients in the mixing tank 229.

The bottom of the mixing tank 229 communicates with a live bottom screw or rotating auger 243 for conveying the emulsion produced in the mixing tank 229 through a conduit 245. Typically, the desired amounts of malt syrup, mineral oil, hot water and the dry ingredients are added to the mixing tank, and are mixed together by the mixer 241 to form an emulsion which then exits the tank 229 by way of the screw auger 243.

The screw auger 243 conveys the emulsion to a positive displacement pump 240 which further conveys the emulsion along the conduit 245 to a shear pump 247 or other high shear mixer. Along the conduit 245 is located a steam injector 242 for introducing steam that heats the emulsion and provides additional formula water. The shear pump 247 helps mix, heat and thicken the emulsion. It has been found that a shear pump or an emulsifier provides good results. The shear pump 247 then conveys the emulsion to a use tank 255 by way of a conduit 253. Located along the conduit is a three-way valve 249. The three-way valve 249 is connected to an outlet conduit 251 that leads back to the mixing tank 229. During preparation of the emulsion in the mixing tank 229, the three-way valve 249 is preferably closed to the conduit 253 at a point downstream of the valve 249 and is open to the outlet conduit 251 for recirculation of the emulsion back to the mixing tank 229 until a desired temperature and consistency in the emulsion is reached. By passing the emulsion back through the mixing tank and the shear pump 247, the emulsion is further mixed, heated and thickened to the desired thickness or viscosity. The valve 249 can also be set up (e.g., provided with a diverter) to allow a sample of the emulsion to be drawn off for purposes of visual inspection.

After the desired temperature and consistency of the emulsion is obtained, the three-way valve 249 is closed to the outlet conduit 251 and the emulsion is allowed to flow downstream of the valve 249 through the outlet conduit 253 to the use tank 255.

A temperature of the emulsion that has been found useful in the context of producing products according to the present invention is 150° F.–180° F., preferably about 165° F. From the standpoint of determining the desired consistency of the emulsion, it has been found useful to utilize an informal test involving placing an amount of emulsion in a plastic cup. The consistency is determined to be acceptable if, upon turning the cup upside down, the emulsion still remains in the cup after a predetermined period of time (e.g., 30 seconds) without falling out of the cup.

The use tank 255 is preferably provided with level controls 257 for indicating a low level condition in the use tank 255. The bottom of the use tank 255 communicates with a screw conveyor 259 such as a live bottom screw or rotating auger which conveys the emulsion from the use tank 255. The screw conveyor 259 preferably delivers the emulsion to a high pressure displacement pump 260 such as a Monyo pump that is adapted to convey the emulsion to a conduit 261 that leads to a three-way valve 263. The three-way valve 263 is connected to a first outlet conduit 265 that recirculates the emulsion back to the use tank 255 and to a second outlet conduit 267 that conveys the emulsion to a manifold 37. By appropriately operating the valve 263, the emulsion can be recirculated back to the use tank 255 which may be desirable if the extrusion process needs to be stopped for a period of time.

Figure 21:
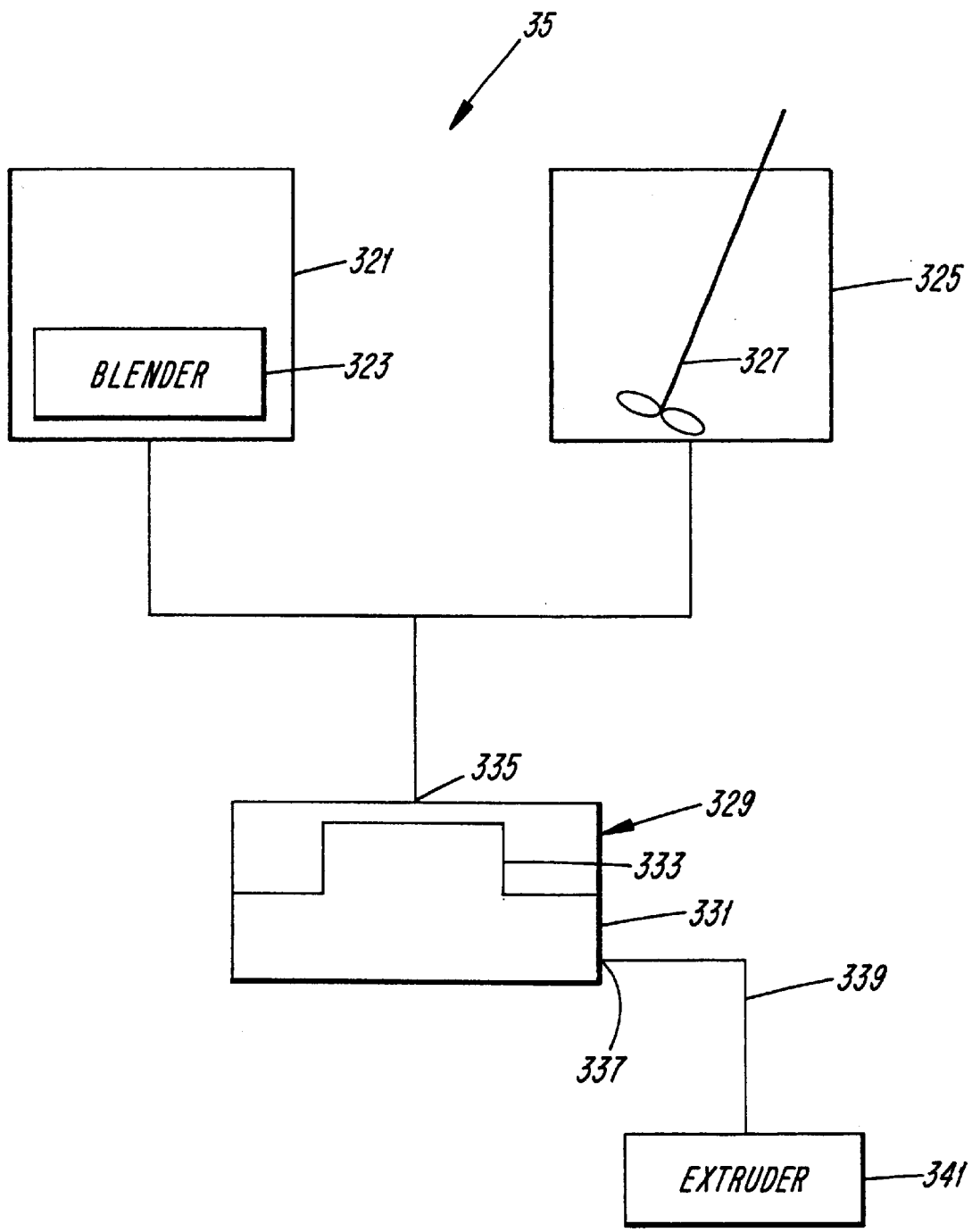
FIG. 21 is a schematic illustration of the source of second material.

The details associated with the second source 35 for preparing and supplying the dough-like outer cover component 31 of the edible product are shown in FIG. 21. The second source 35 preferably includes a mixing tank 321 for receiving dry ingredients. The dry ingredients can include, for example, soy flour, wheat flour, calcium sulfate, colors, and salts. Other dry ingredients can also be added. The mixing tank 321 is preferably outfitted with a suitable mixer such as a ribbon blender 323 for mixing the dry ingredients. The dry ingredients may be introduced to the mixing tank 321 from separate sources of the dry ingredients, such as separate tanks from which the dry ingredients flow through a conduit by a gravity feed or by any other suitable technique.

The second material source 35 further includes a mixing tank 325 for mixing liquid and meat ingredients. The liquid ingredients can include glycerine, water, malt syrup, acid, meats and preservatives which, like the dry ingredients, can be introduced into the mixing tank 325 in any suitable manner from any suitable source of supply. Other liquid ingredients can also be added. A suitable liquid mixer 327, such as a lightening mixer, is provided in the liquid ingredients mixing tank 325 for mixing the liquid ingredients.

The liquid ingredients and the dry ingredients are introduced from the respective mixing tanks 321, 325 to a dough mixer 329. If desired or necessary, the liquid and dry ingredients can be pumped or otherwise conveyed, or they can flow to the dough mixer 329 under gravity. Valved conduits may be provided if desired or necessary. Additional liquid or dry ingredients (e.g., colors, flavors, vitamins, minerals or other palatants) may also be added to the dough mixer 324. The dough mixer 329 is preferably in the form of a tank 331 in which is located a rotatably driven mixing blade 333. The dough mixer 329 also includes an outlet through which the mixed dough passes. The dough mixer 329 is preferably of a batch type that receives dry and liquid ingredients at one or more inlets 335 and delivers mixed dough from an outlet 337. From the outlet 337 of the dough mixer 329, the dough-like material is delivered through a conduit 339 to an extruder 341 which may be in the form of a Bonnot extruder. The extruder 341 heats the dough to a temperature preferably between about 180° F. and about 212° F. This causes the dough-like material to be cooked and pasteurized. The cooked dough-like material is extruded to the manifold 37 which is generally shown in FIG. 1. It is to be recognized that the temperatures mentioned above have been found to be suitable for making edible pet treats or pet products having a dough-like product that encapsulates an emulsion for hairball treatment. These temperatures may vary when the invention is applied to the production of different products involving different ingredients.

Figure 2:
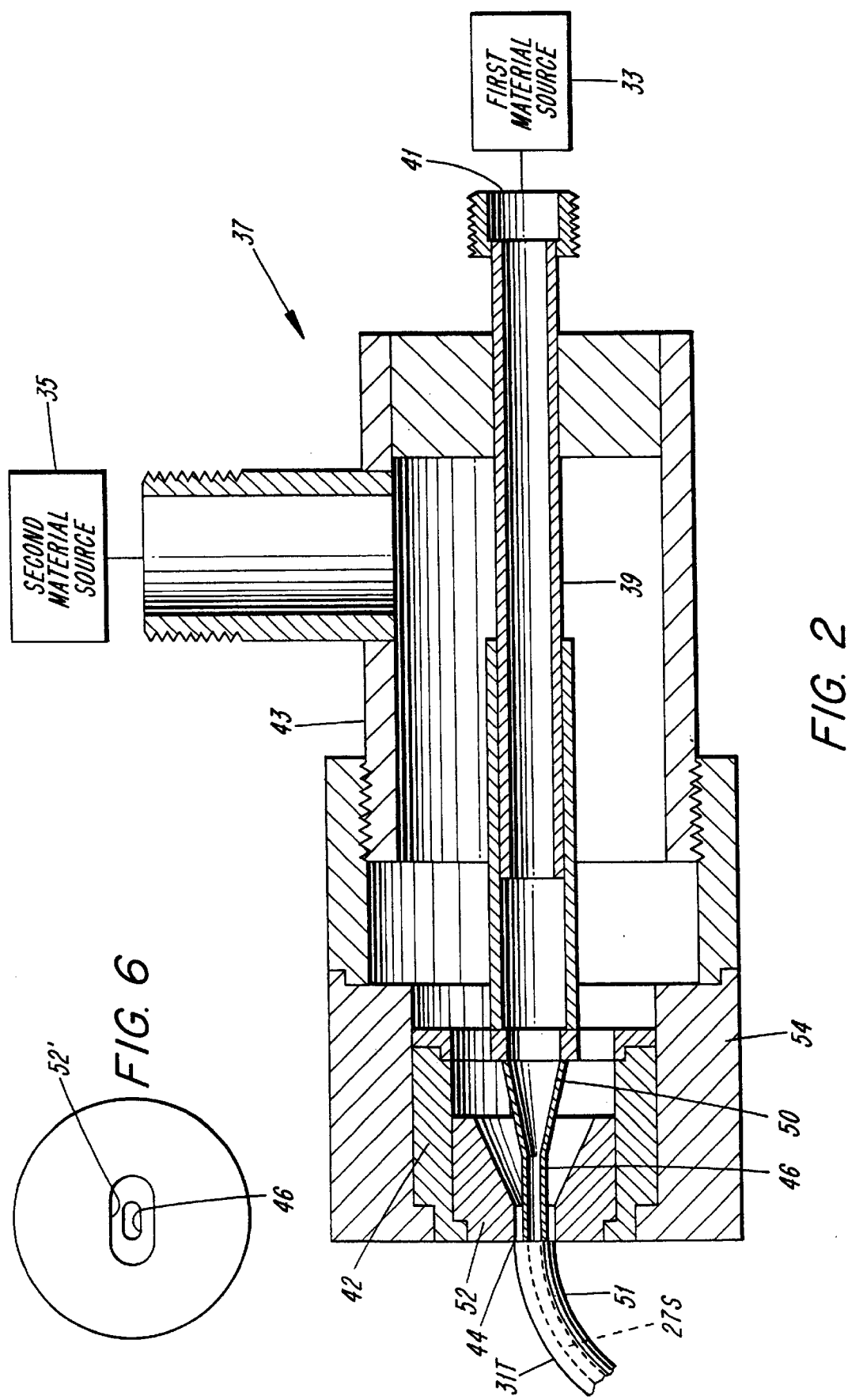
FIG. 2 is a cross-sectional side view of the manifold used in the system of FIG. 1 for dispensing the edible product in the form of a continuous rope.

The manifold 37 can actually be connected directly to the forward end of the extruder. Additional details associated with the manifold 37 are shown in FIG. 2. The manifold 37 includes a first conduit 39 having one end 41 connected to the first material source 33 which supplies the inner component of the edible product (e.g., emulsion). As shown in FIG. 2, the end portion of the first conduit 39 adjacent the first end 41 can be threaded for connection to the extruder 341. The opposite end 47 of the first conduit 39 is connected to a die insert 50 that necks down to form a pin 46 at the end of the conduit 39. The end of the pin 46 adjacent the forward end of the manifold (i.e., the left end of the pin 46 as seen in FIG. 2) is oval-shaped. This generally oval shaped configuration for the end of the pin 44 helps reduce stress during subsequent crimping.

Figure 3:
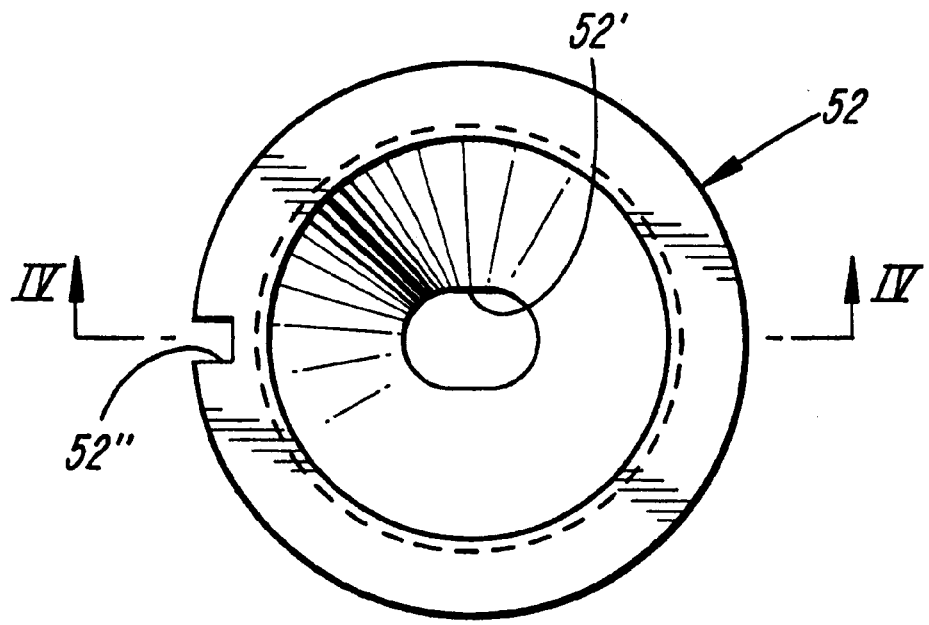
FIG. 3 is an end view of a die insert used in the manifold shown in FIG. 2.
Figure 4:
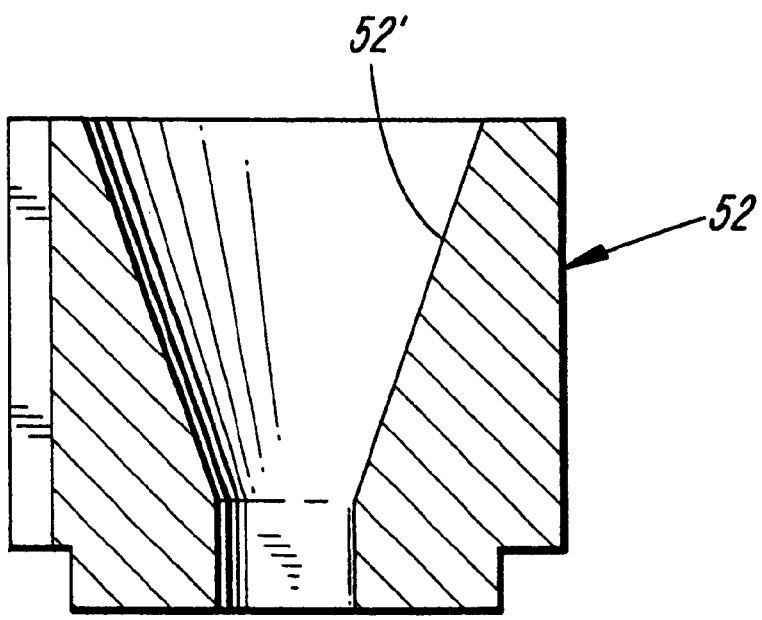
FIG. 4 is a cross-sectional view of the die insert shown in FIG. 3 taken along the section line IV—IV.

The manifold 37 further includes a second conduit 43 of larger outside dimension than the first conduit 43 so that the first conduit 39 extends within the second conduit 43. The second conduit 43 is connected to the second material source 35 which supplies the outer component of the edible product (e.g., the dough-like material). The outer surface of the forward end of the second conduit 43 is threaded to receive a correspondingly threaded portion of a mounting element 54. The mounting element 54 receives a holder 42 in which is positioned a die insert 52. The die insert 52 is shown in more detail in FIG. 3 and FIG. 4 and includes a through hole 52' that narrows or tapers in dimension along a portion of its extent. The forwardmost end portion of the through hole 52' is of a generally constant dimension and possesses a generally oval shape as seen in FIG. 3. The die insert 52 also includes a slot 52" on its outer surface that is adapted to be engaged by a projection or key provided on the mounting element 54 to position the die insert 52 within the mounting element 54.

Figure 5:
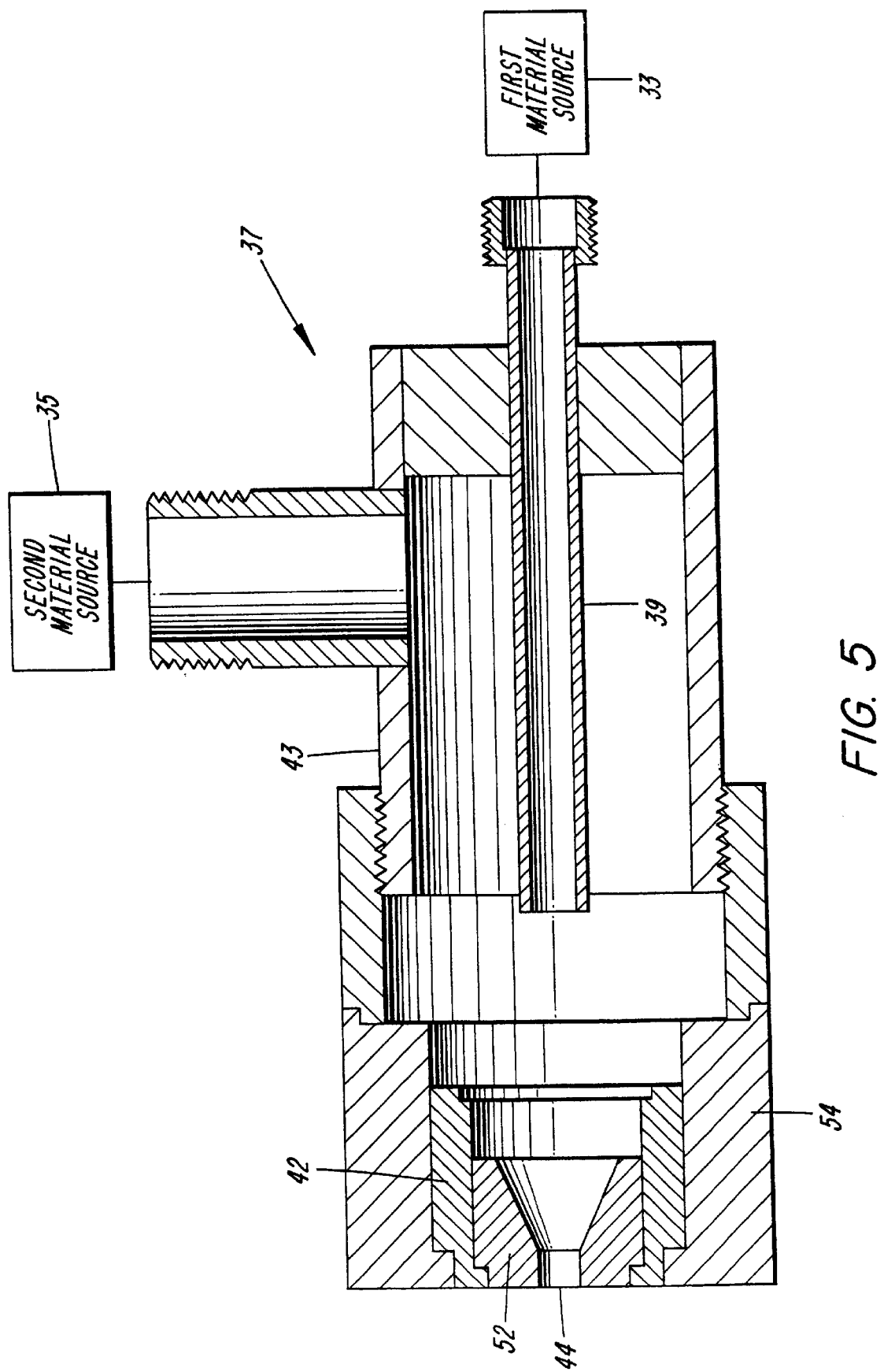
FIG. 5 is a cross-sectional view of an alternative form of the manifold used in the manifold shown in FIG. 2.

The forwardmost end of the manifold 37 constitutes a nozzle 44 from which is coextruded the edible inner material (e.g., emulsion) from the first material source 33 and the edible outer cover material (e.g., dough-like material) from the second material source 35 to produce the rope of edible product. The manifold 37 shown in FIG. 2 is designed so that the forwardmost end of the first conduit 39 (i.e., the tip of the pin 46) lies in the same plane as (i.e., is even with) the plane of the forwardmost end of the manifold 37. This thus means that the edible inner material from the first material source 33 is deposited into the edible outer material from the second material source 35 at a point outside the manifold 37 which is not under pressure. This is advantageous from the standpoint of providing a better seal between the materials. This is because the inner material has less of a coating impact due to its introduction into the outer cover in a low or no-pressure area. For this same reason, the end of the pin 46 could be located forward of the forwardmost end of the manifold 37. It has been found however that positioning the pin 46 so that its forward end is coincident with or forward of the forwardmost end of the manifold 37 can increase the pressure in the manifold, including the pressure associated with the pumping of the dough material. This may be of concern depending upon the composition of the dough material, such as if the dough material contains particulate matter. Thus, it may be desirable in some instances to do away with the pin 46 altogether such as shown in FIG. 5. This version of the manifold is the same as that described above and shown in FIG. 1 except that the forwardmost end of the first conduit 39 is spaced from and set back from the forwardmost end of the manifold 37.

During operation, the inner edible component (e.g., emulsion) is continuously fed under pressure through the first conduit 39 while the edible outer component (e.g., dough-like material) is continuously fed under pressure through the second conduit 43. The Monyo pump for pumping the emulsion is typically operated at 400 psi–1000 psi and the dough-like material is fed at a pressure between 800–1000 psi. Of course, these pressures may vary depending upon the characteristics of the edible inner and outer materials so that if a different edible product is being produced (e.g., an edible product in which the edible inner component is not a medicament), different pressures may be utilized. During extrusion, the edible outer material surrounds the edible inner material to produce a long continuous rope 51 of edible product that is extruded through the nozzle 44 of the manifold 37 as schematically shown in FIG. 2.

As seen in FIG. 1, the elongated continuous rope 51 of edible product is fed from the manifold 37 to a crimping apparatus 53. The crimping apparatus 53 is designed to cut or sever the rope 51 of edible product into individual products or treats. Details relating to the crimping apparatus 53 will be described below in more detail.

After the rope 51 of edible product is separated into individual edible products or treats in the crimping apparatus 53, the edible treats or products may be fed into an enrobing system 200 at which a coating is sprayed onto or otherwise applied to the individual products or treats. The enrobing system 200 can include a drum into which the products or treats are conveyed, with the coating being sprayed or otherwise applied as the products are being rotated in the drum. The coating that is applied at the enrobing system 200 can be a coating that is selected to improve the palatability of the products or treats. Examples of coatings include fats, digests, flavors, chicken or any combination of such items. From the enrobing system 200, the coated products or treats can be conveyed along a conveyor 201 to a cooler 202 at which the products or treats are cooled and dried. The cooler 202 can be in the form of, for example, a wire mesh conveyor belt below which are arranged fans or blowers to direct cooled air at the products to cool and dry the products. Once the products or treats are cooled, they can be packaged.

Figure 19:
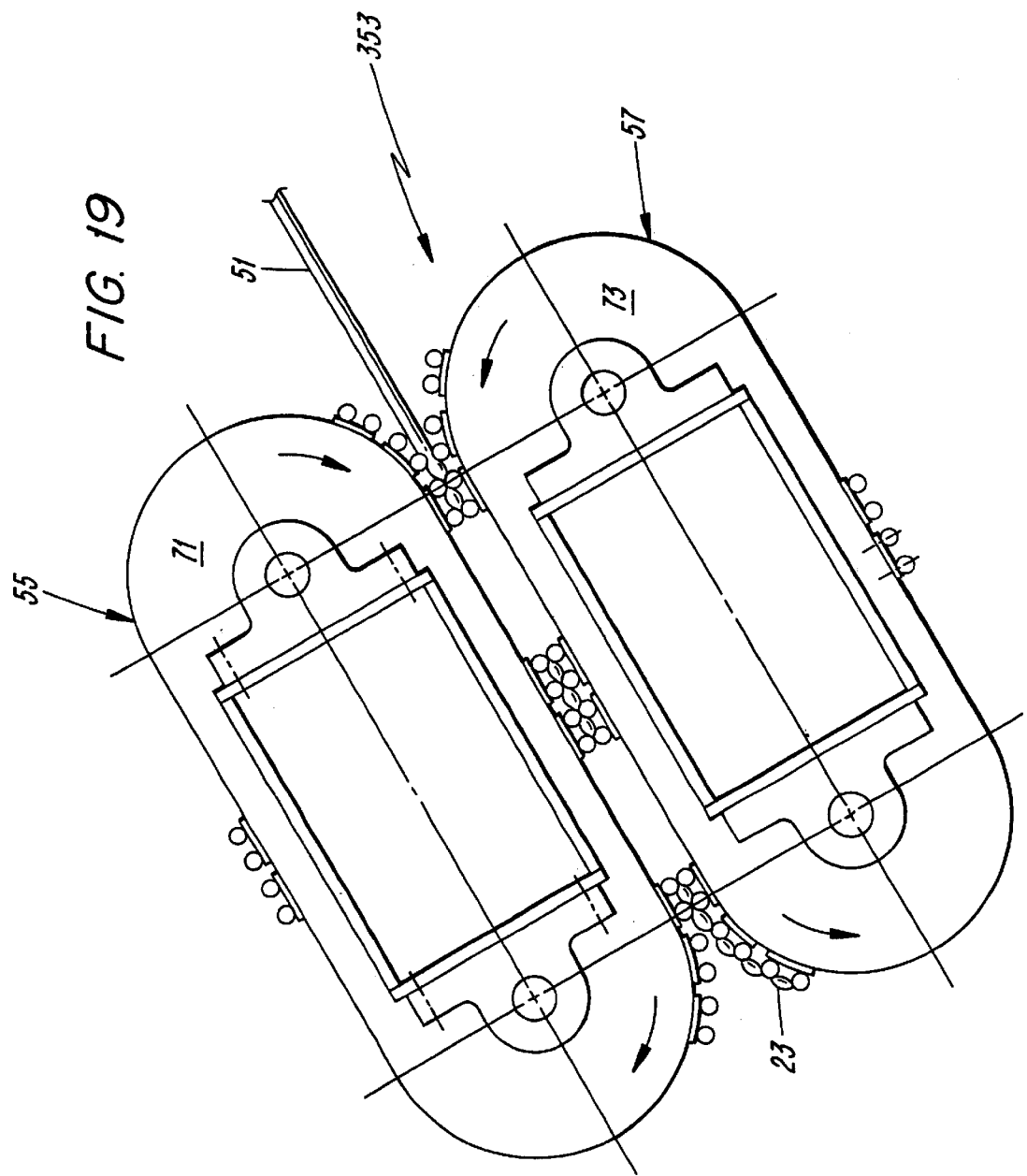
FIG. 19 is a side view of a crimping apparatus according to another embodiment of the present invention.
Figure 20:
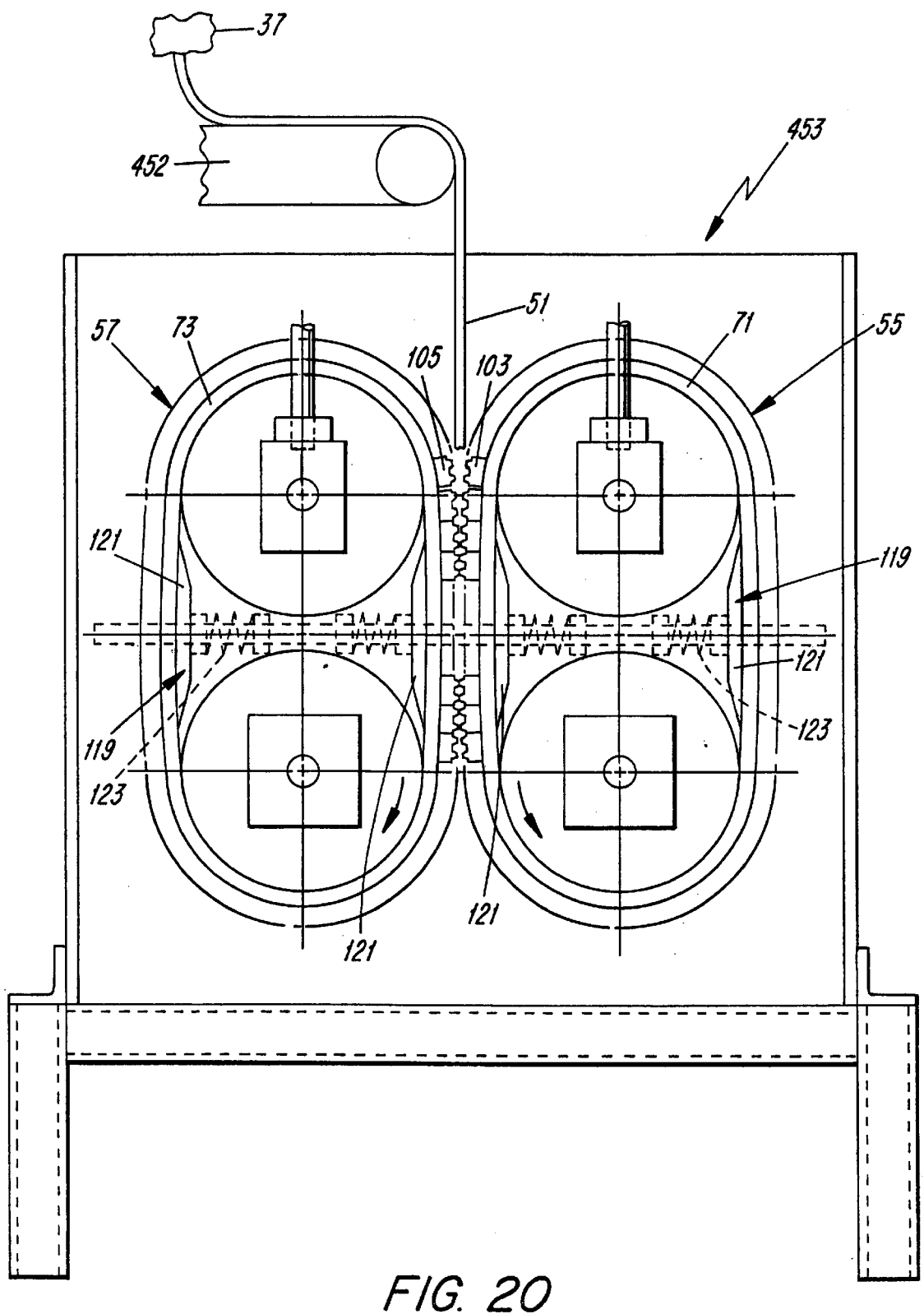
FIG. 20 is a side view of a crimping apparatus according to another embodiment of the present invention.

As described above, the rope 51 of edible product that is extruded from the manifold nozzle is fed to a crimping apparatus 53 to cut or sever the rope 51 at spaced apart locations to form individual products. One form of the crimping apparatus is shown in FIGS. 11 and 12 and three other forms of the crimping apparatus are shown in FIGS. 13, 19 and 20.

Figure 11:
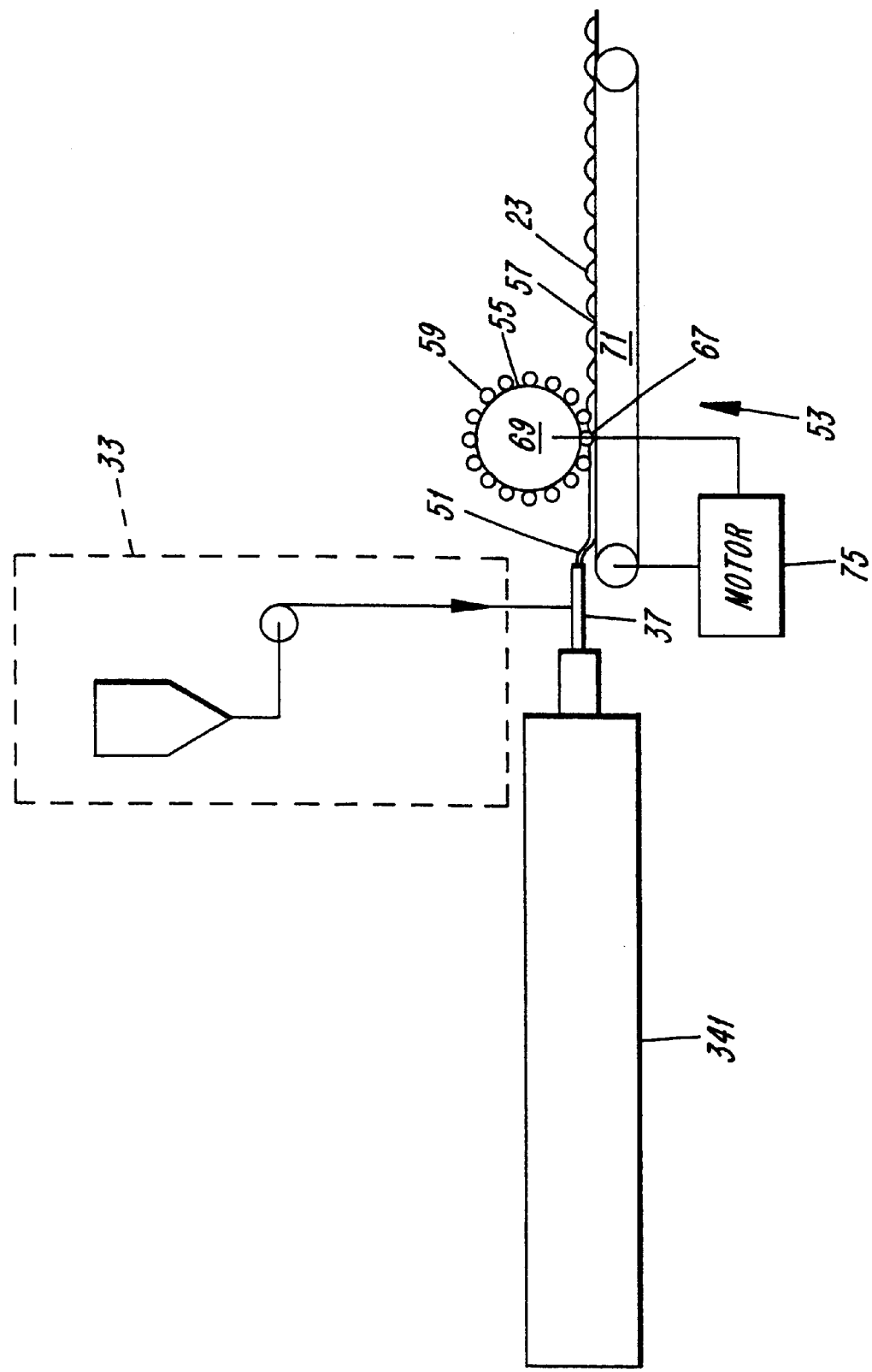
FIG. 11 is a side view of one embodiment of a crimping apparatus according to the present invention used to form the edible product shown in FIGS. 7 and 8.

The first embodiment of the crimping apparatus is shown in FIG. 11 which also illustrates the first material source 33 which supplies the edible inner material (e.g., emulsion) and the extruder 341 from which is extruded the rope of edible product. FIG. 11 also illustrates the manifold 37 into which the material from the first material source 33 and the material from the second material source 35 are fed, and from which the continuous rope 51 of edible product is extruded.

The crimping apparatus 53 shown in FIG. 11 generally includes a first moving surface 55 and an opposing second moving surface 57. The first moving surface 55 and the opposing second moving surface 57 preferably include wheels, belts, chain assemblies, and the like, or some combination of such illustrative endless surfaces. The term endless surface, as used herein, shall be understood to include discontinuous surfaces that are attached to one another by structures such as belts, chains, and the like. The first moving surface 55 and the opposing second moving surface 57 form a compression point which receives the rope 51 that is being extruded out of the manifold nozzle. The moving surface 55 and the opposing moving surface 57 move at the same speed and in the same direction at the compression point.

Figure 12:
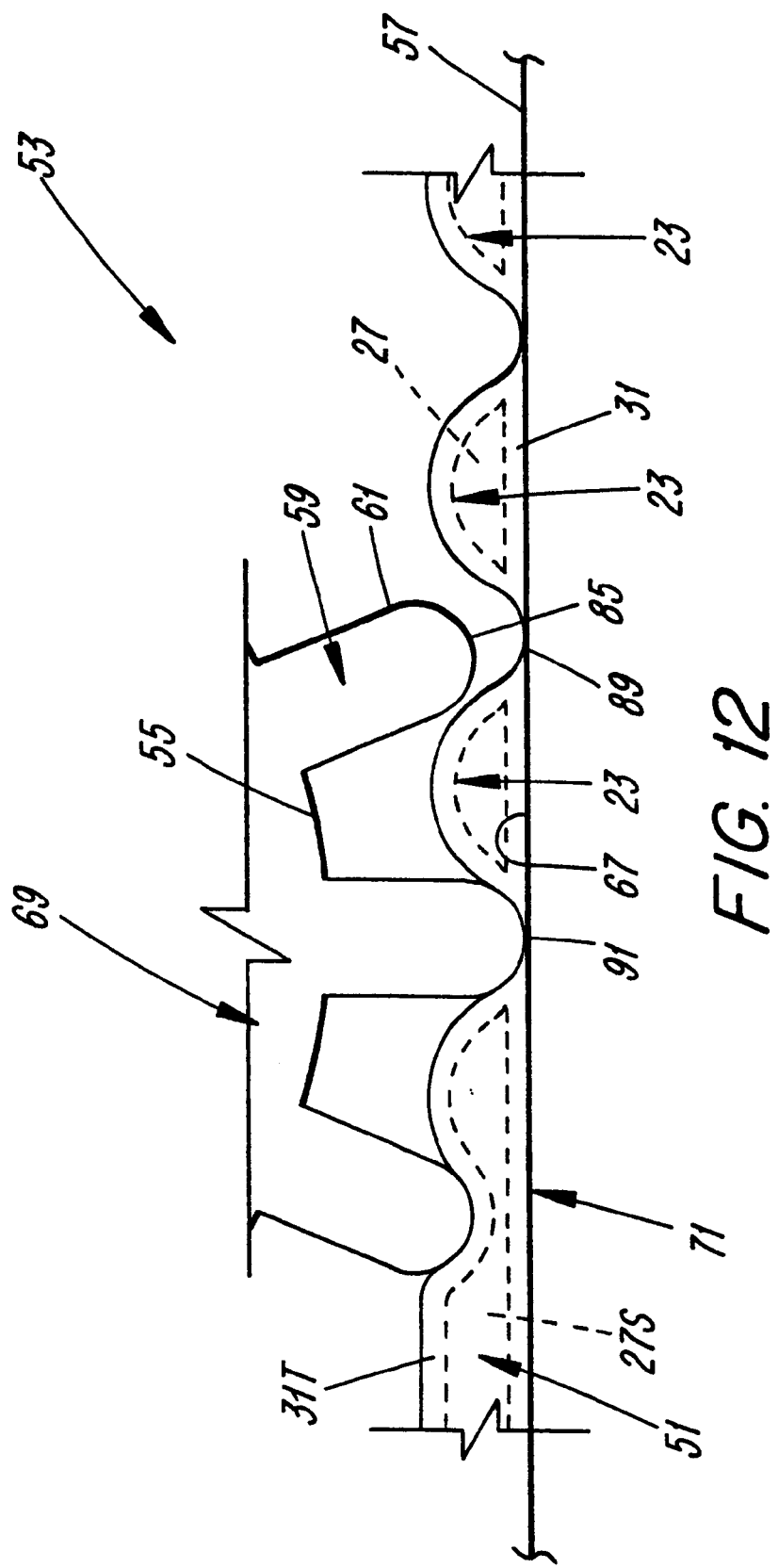
FIG. 12 is an enlarged side view of a portion of the crimping apparatus shown in FIG. 11.
Figure 13:
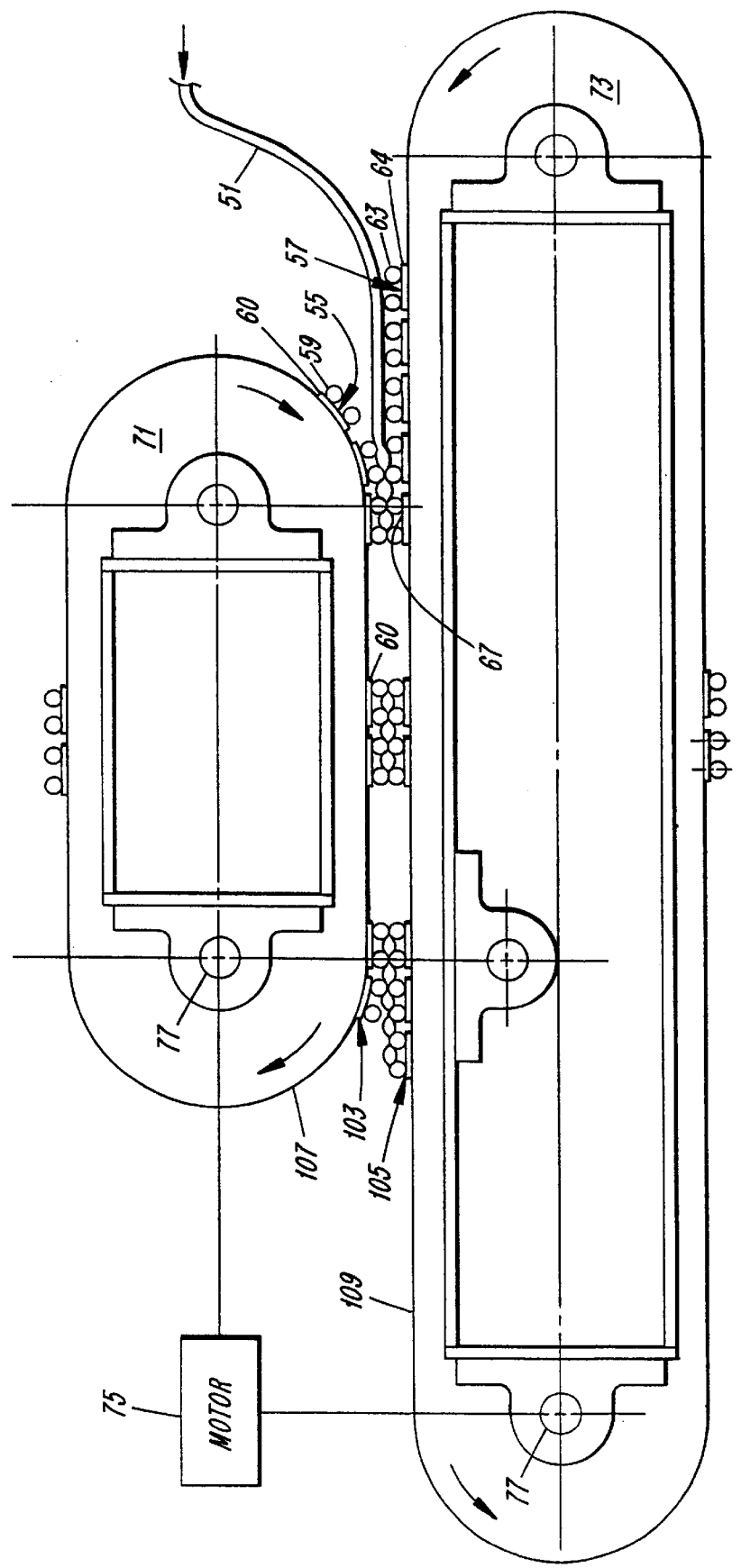
FIG. 13 is a side view of another embodiment of a crimping apparatus according to the present invention used to form the edible product shown in FIGS. 9 and 10.

In the embodiment of the crimping apparatus shown in FIGS. 11 and 12, the first moving surface 55 is in the form of a crimping wheel 69 provided with a plurality of radially outwardly extending and laterally arranged protrusions or crimping elements 59. The protrusions 59 are preferably equally spaced apart from one another around the circumference of the wheel 69. The second moving surface 57 is in the form of an endless conveyor belt 71 having a flat surface 67. The crimping wheel 69 shown in FIGS. 11 and 12 is positioned relative to the surface 67 of the conveyor belt 71 such that the crimping elements 59 contact or substantially contact the surface 67 of the conveyor belt 71 when each crimping element 59 reaches the compression point at which the crimping element 59 is located closest to the conveyor belt surface. It is possible to utilize a conveyor belt whose height or position relative to the crimping wheel 69 can be adjusted or varied to thereby adjust the amount, if any, of pressure exerted by the crimping elements 59 on the surface 67 of the conveyor belt 71. When the rope of edible product 51 passes through the compression point, the crimping element 59 located at the compression point compresses the underlying portion of the rope 51, with the top portion of the rope being forced downwardly towards the conveyor surface as shown in FIG. 12. The interaction between the crimping elements 59 and the surface 67 of the conveyor 71 also causes the continuous rope 51 to be crimped and severed at the points of compression to form individual separated edible products each comprised of an edible inner component and an edible outer cover component sealed at its opposite ends. In the described example, the individual separated edible products are in the form of cat treats or products 23, each comprised of a hairball treatment preparation substantially completely encapsulated within an outer cover. It is to be understood that the ends of the individual products are sealed, but the sealed ends may separate a small amount over time, such as during subsequent drying. Nevertheless, the edible inner component is substantially completely encapsulated within the edible outer component.

As seen in FIG. 11, the free end of each of the crimping elements 69 is curved or rounded. This causes the rope 51 of edible product to be gently and smoothly compressed as the end of the crimping element 59 contacts and then presses down on the rope 51 of edible product. This can help reduce the stress on the cover material 37T as the cover material is compressed. If excessive stress is applied to the cover material, a break can form in the cover, thus exposing the emulsion. While FIG. 12 illustrates the crimping elements as being in the form of somewhat elongated, finger-like projections as seen in cross-section, it is possible to use crimping elements that are in the form of elongated cylindrical elements having a generally circular cross-section as shown in FIG. 11 to once again present a rounded surface for compressing the rope 51 of edible product.

Figure 18:
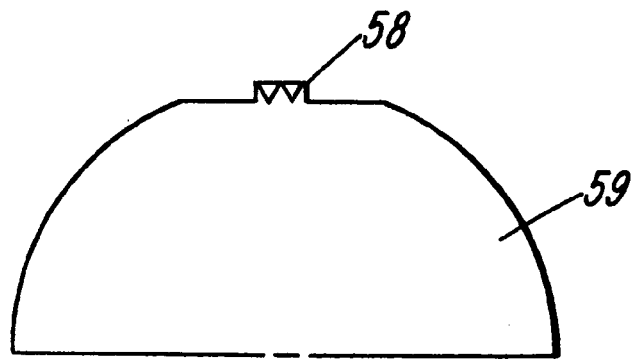
FIG. 18 is a side view of another embodiment of the crimping element usable in the various crimping apparatus according to the present invention.

As shown in FIG. 18, the outer end surface of the crimping elements 59 can be provided with a raised ridge 58 having a knurled or otherwise roughened outer surface. It has been found that such a construction helps facilitate complete cutting of the rope 51 of edible product to form separate edible treats or products 23. The need for being able to completely cut the rope 51 of edible product with the crimping elements 59 is particularly significant because the production of products on a large scale commercial level preferably requires that the rope 51 be cut into separate products or treats by the crimping elements 59 without the need for subsequent intervention or processing to ensure that the individual treats are completely separated.

It can be seen from FIG. 11 that the crimping wheel 69 is spaced from the end of the conveyor belt 712 that is located closest to the manifold 37. This allows the rope 51 of edible product extruded from the manifold nozzle to be arranged in a flat arrangement on the belt 71 prior to being subjected to the crimping action of the crimping apparatus. Supporting the rope 51 of edible product in this manner is useful in the context of the crimping apparatus shown in FIGS. 11 and 12 because of the rather flexible nature of the rope 51 as it is extruded from the manifold nozzle. This also helps to avoid excessively stretching the rope 51 of edible product.

The conveyor belt 71 is rotatably driven to rotate in the clockwise direction when viewed with reference to the illustration in FIG. 11 while the crimping wheel 69 is rotatably driven to rotate in the counter clockwise direction when viewed with reference to the illustration in FIG. 11. The conveyor belt 71 and the crimping wheel 69 can be driven by a common motor 75 as shown in FIG. 11 or they can be rotatably driven by separate motors.

As the rope 51 of extruded product is extruded out of the nozzle of the manifold 37, the rope 51 is laid onto the flat surface of the conveyor belt 71. The conveyor belt 71 conveys the rope 51 to the crimping wheel 69 for crimping the rope at regular spaced intervals through engagement of the rope 51 with the crimping elements 59 to cause the rope to be divided into separate individual edible products.

The crimping apparatus shown in FIGS. 11 and 12 produces edible cat treats or products having a shape generally along the lines illustrated in FIGS. 9 and 10. FIG. 9 represents a cross-sectional view of the edible product as would be seen taking a section through the rope along a plane parallel to the longitudinal axis of the rope 51 of edible product. As can be seen, the crimping apparatus shown in FIGS. 11 and 12 causes the cover to be compressed from the top of the rope to the bottom of the rope to form tapering edge regions 93, 95.

Figure 24:
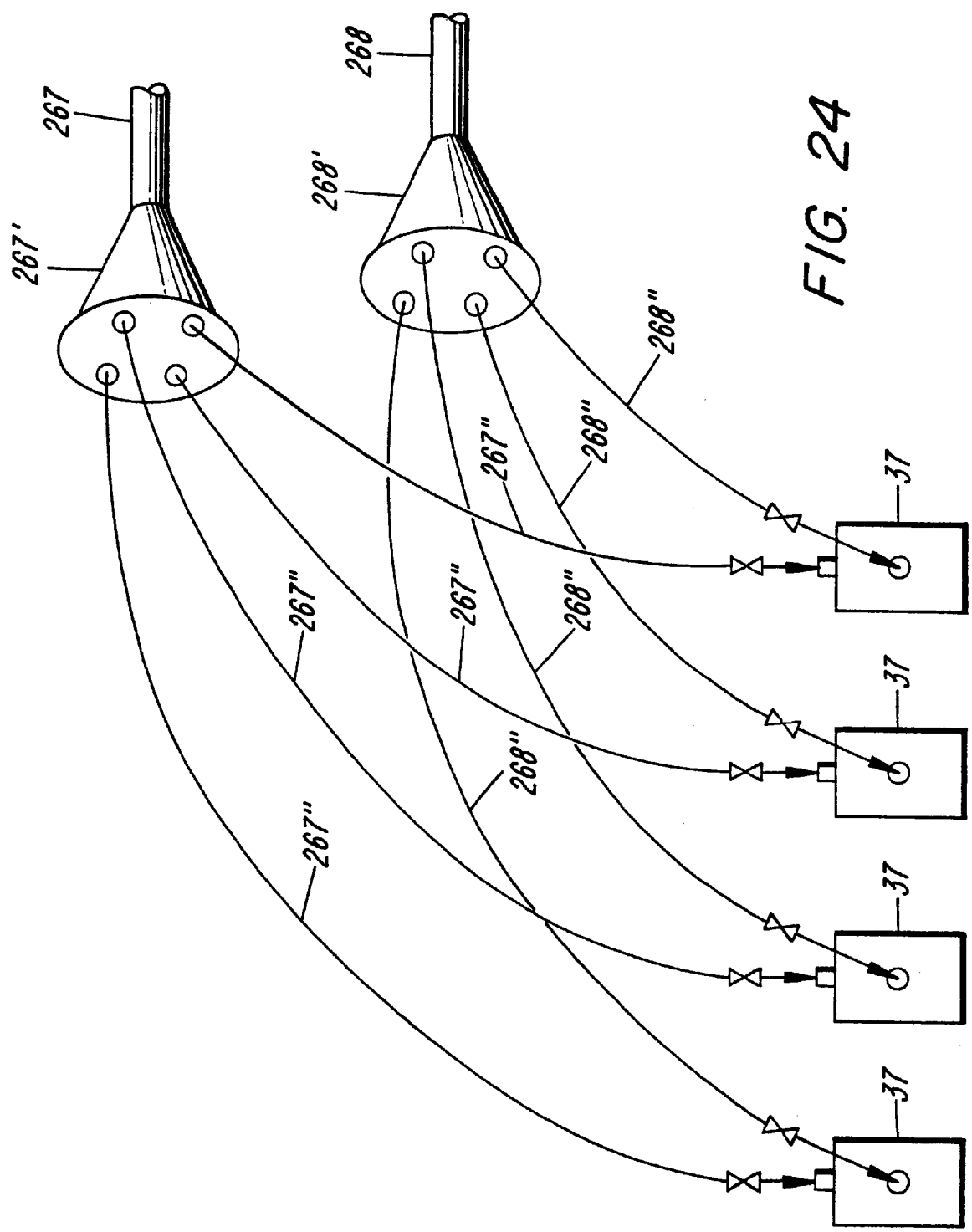
FIG. 24 is a schematic illustration showing several manifolds connected to the emulsion and dough-like material feed conduits for simultaneously producing several ropes of edible product.

The crimping apparatus shown in FIGS. 11 and 12 can be used to produce individual edible products from a single rope 51 of edible product onto the surface of the conveyor belt 71. Alternatively, the output of the crimping apparatus can be increased by extruding two or more ropes of edible product onto the surface of the conveyor belt 71 at the same time. The extrusion of multiple ropes simultaneously can be performed by connecting several manifolds to the emulsion carrying conduit 267 and the extruder 35 shown in FIG. 1. As seen with reference to FIG. 24, this can be accomplished by providing a divider mechanism 267' along the conduit 267 that provides multiple lines 267", with each of the lines 267" being connected to a separate manifold 37. Similarly, a conduit 268 extending from the extruder 35 can be provided with a divider mechanism 268' providing multiple lines 268", with each of the lines 268" being connected to one of the manifolds 37. It is also possible for a single manifold 37 to be designed to simultaneously extrude multiple ropes of edible product. The crimping elements 59 on the crimping wheel 69 should possess sufficient extent in a direction parallel to the rotational axis of the crimping roller to accommodate the multiple ropes.

Figure 14:
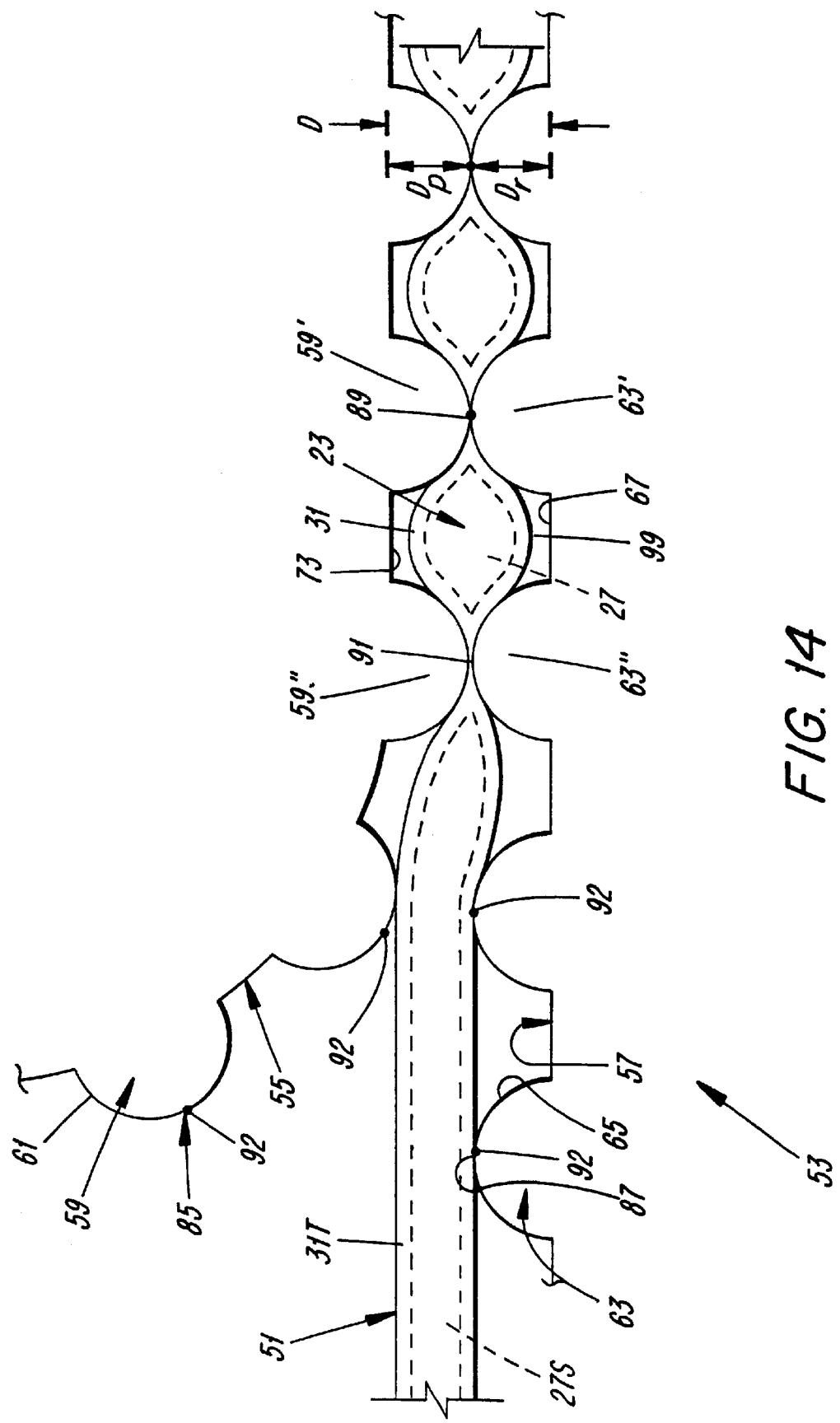
FIG. 14 is an enlarged side view of a portion of the crimping apparatus shown in FIG. 13.

A second version of the crimping apparatus is shown in FIGS. 13 and 14. Here, the first moving surface 55 and the opposing second moving surface 57 are preferably both in the form of endless chains. This chain crimping conveyor version includes a pair of horizontally arranged endless chains 71, 73. One of the endless chains 71 is rotatably driven in the clockwise direction as seen with reference to the view in FIG. 13 and is arranged above the other endless chain 73 which is rotatably driven in the counter clockwise direction as seen with reference to the view in FIG. 13. The chains 71, 73 can be driven by a common drive motor 75 or by separate motors that are connected to sprockets or gears 77 around which the chains 71, 73 are conveyed.

As can be readily seen from FIG. 13, the lower chain 73 has a greater horizontal extent than the upper chain 71. The reason for this is that because of the horizontal arrangement of the chains 71, 73 and the extremely pliable or flexible nature of the rope 51 of edible product exiting the manifold, the rope 51 of edible product should preferably be laid on the surface of the bottom chain 73 before being crimped to avoid excessively stretching the rope as it exits the manifold nozzle.

A plurality of spaced apart crimping devices 103 are secured to the upper chain 71 and a plurality of spaced apart crimping devices 105 are secured to the lower chain 73. In the illustrated embodiment, the crimping devices 103, 105 are preferably equally spaced apart on the respective chains 71, 73. FIG. 13 only shows crimping devices 103, 105 at certain locations on the upper and lower chains, but this illustration is only for purposes of simplicity and ease in understanding the present invention. It is to be understood that the crimping devices 103, 105 are in fact distributed along the entirety of the respective chains 71, 73.

Each of the crimping devices 103 on the upper chain 71 is comprised of a pair of protuberances or crimping elements 59 provided on an attachment portion 60. Similarly, each of the crimping devices 105 on the lower chain 73 is comprised of a pair of protuberances or crimping elements 63 provided on an attachment portion 64. The crimping elements 59, 63 have rounded or curved end surfaces similar to the curved or rounded end surfaces provided on the crimping elements 59 used in the crimping wheel depicted in FIGS. 11 and 12. The particular spacing of the crimping elements 59, 63 is designed so that each crimping element on the one chain is able to align with or come into confronting relation to a crimping element on the other chain in the manner described below.

The attachment portion 60, 64 associated with each crimping device 103, 105 is adapted to be attached to the respective conveyor chain 71, 73. The following discussion of one way for connecting the attachment portion 64 of each crimping device 105 to the upper chain conveyor 71 also applies to the connection of the attachment portion 64 of the crimping device 105 to the lower chain conveyor 73.

Figure 15:
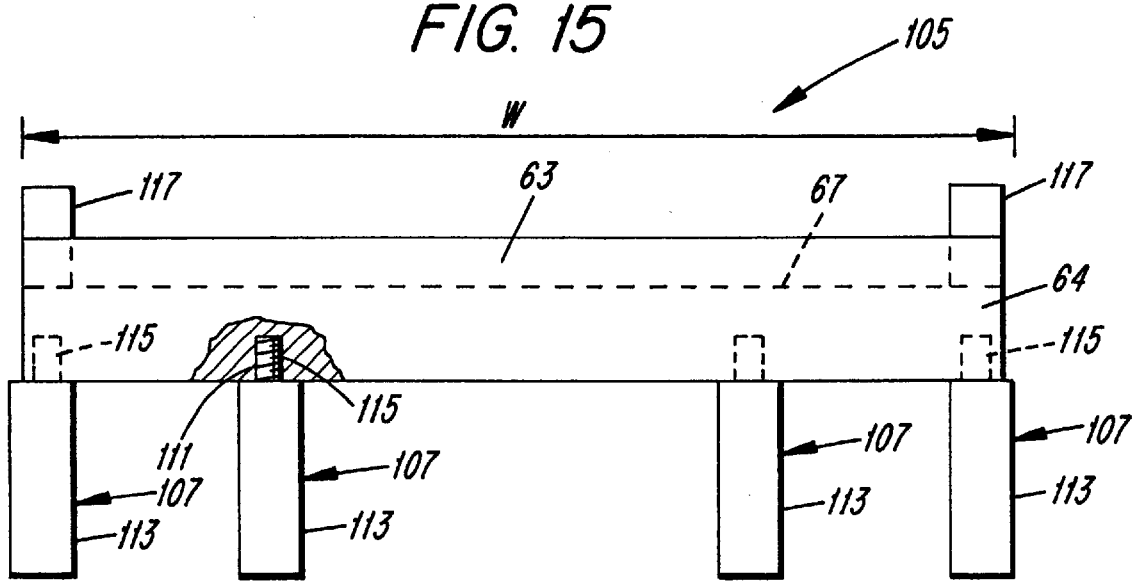
FIG. 15 is a front view of an embodiment of a crimping element or attachment used in the crimping apparatus according to the present invention.

As seen in FIG. 15, the attachment portion 64 of each crimping device 105 may be provided with a plurality of spaced apart threaded blind bores 115. This allows the crimping device 105 to be attached to the links forming the upper chain conveyor 71 by suitable fasteners 111, such as bolts that extend from the chain links 113 into the threaded bores 115.

Figure 16:
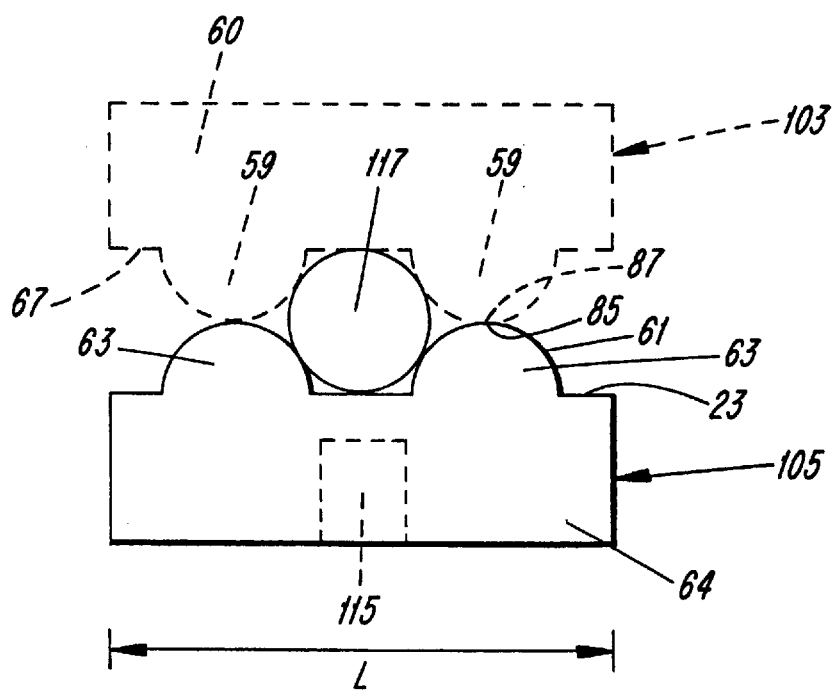
FIG. 16 is a side view of the crimping element or attachment shown in FIG. 15.

As seen in FIG. 16, each crimping device 105, 103 preferably has two protrusions or crimping elements 59, 63. The spacing between the two crimping elements 59, 63 forming each crimping device 103, 105 defines the size of the product or treat that is formed by crimping the rope 51 of edible product with the crimping elements 59, 63. Thus, by appropriately dimensioning the spacing between the crimping elements 59, 63 on each crimping device 103, 105, and appropriately dimensioning the spacing between adjacent crimping devices 10, 105, it is possible to achieve the desired product size. Moreover, by providing each crimping device 103, 105 with a pair of crimping elements 59, 63, each of the crimping devices 103, 105 can be identically produced to ensure that the size of each resulting product is the same. Of course, if desired or necessary, the crimping devices 103, 105 could be provided with a single crimping element.

In the embodiment of the crimping devices 103, 105 shown in FIG. 16, the attachment portion 60, 64 and the crimping elements 59, 63 forming each crimping device 103, 105 are illustrated as being formed in one piece. As an alternative, the crimping elements and the attachment portion can be formed as separate pieces that are connected together in any suitable way. Thus, for example, as illustrated in FIG. 13, the attachment portion can be a plate and the crimping elements can be in the form of elongated rods that are welded to the plate.

Figure 17:
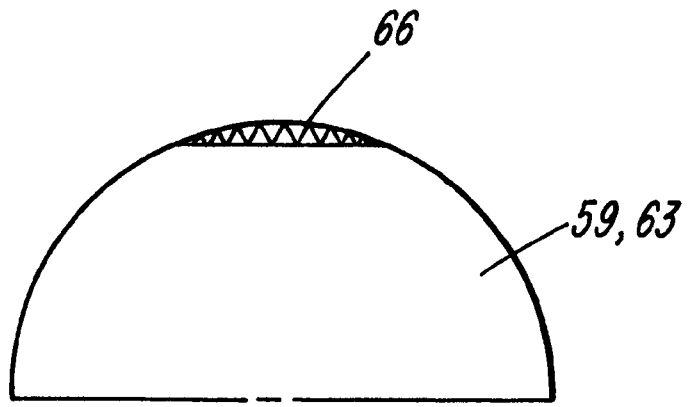
FIG. 17 is a side view of a crimping element usable in the various crimping apparatus according to the present invention.

The crimping elements 59, 63 when viewed from the side, preferably possess a rounded shape in the form of a half-circle extending upwardly from the flat surface 67, 73 of the attachment portion 60, 64. To facilitate the cutting of the rope 51 of edible product with the crimping elements 59, 63, the end surface of the crimping elements 59, 63 can be provided with a region 66 that is knurled or otherwise roughened as shown in FIG. 17. This same construction can be employed in the case of the crimping elements used in the embodiment of the crimping apparatus shown in FIGS. 11 and 12. Similarly, the knurled or roughened ridge shown in FIG. 17 can be employed in connection with the crimping elements 59, 63 used in the embodiment of the crimping apparatus shown in FIGS. 13–16. Of course, it is to be understood that the cutting of the rope 51 of edible product may be performed in such a way that a small residual of material remains between adjacent individual products, with such material providing a tenuous connection between adjacent individual products that can be broken or severed during subsequent handling.

During operation of the crimping apparatus shown in FIG. 13, the rope 51 of edible product that is extruded from the nozzle of the manifold is directed so that it exits the manifold nozzle and is laid on the extended surface of the rotating lower chain 73. The rope 51 laid on the moving surface defined by the lower chain is advanced to the left as seen with reference to the illustration in FIG. 13 towards the region where the crimping elements 59, 63 on the two chains 71, 73 come together. The two chains 71, 73 are driven so that the movement of the crimping elements 59 on the one chain 71 are synchronized with the movement of the crimping elements 63 on the other chain 73. The movement is synchronized so that in the compression point between the two opposing moving surfaces, the endmost point 85 of each crimping element 59 associated with the upper chain 71 contacts or closely approaches contact with the endmost point 87 of one of the crimping elements 63 associated with the lower chain 73. The linear velocities of the endmost points 85, 87 in the compression point between the two opposing moving surfaces 55, 57 are preferably identical.

FIG. 14 illustrates the rope 51 of edible product moving from left to right as it enters the compression point between the two moving surfaces. As the rope 51 of edible product enters the compression point, two opposing crimping elements 59', 63' approach one another and begin to cut or separate the rope 51. As the rope 51 advances further, the opposing crimping elements 59', 63' confront one another and eventually contact one another, thereby cutting or severing the rope 51 at a first region to form one edge of an edible product or treat 23. Further movement of the chains 71, 73 causes the next two opposing crimping elements 59", 63" to approach and eventually contact one another, thus cutting or severing the rope 51 of edible product at a second region forming the other edge of the edible product or treat 23.

The embodiment of the crimping apparatus shown in FIGS. 13 and 14 produces pillow-shaped edible products or treats 23 such as shown in FIGS. 7 and 8 which possess a rounded top and a rounded bottom. By virtue of the opposing crimping elements between which is crimped the rope 51 of edible product, the top surface of the rope is pressed downwardly by the upper crimping element 59 while the bottom surface of the rope 51 is pressed upwardly by the lower crimping element 63. As the rope 51 is cut or severed, the cut or severed ends are sealed to one another to seal opposite ends of the resulting products or treats and prevent the edible inner component (e.g., emulsion) within the edible outer component (e.g., dough-like material) from leaking out. Here, the dough-like outer cover component 31 exiting the manifold nozzle is hot and relatively plastic, and possesses characteristics that facilitate the sealing of the ends during the crimping. This thus results in edible products or treats 23 having an intermediately located seal or crimped area 93 at one end and an intermediately located seal or crimped area 95 at the other end as seen in FIG. 7.

With reference to FIG. 13, as the rope 51 of edible product is crimped between a first pair of opposing crimping elements 59', 63', the portion of the emulsion 27S located at the crimped region is forced outwardly away from the crimped region. The dough-like outer tube 31T possesses sufficient plasticity that it can expand to accommodate this shift or displacement of the emulsion 27S. The embodiment of the crimping apparatus shown in FIGS. 13 and 14 advantageously prevents the displaced emulsion 27S from applying a force to the just formed sealed or crimped end which would tend to break the seal. As discussed above, as the rope 51 of edible product moves between a first pair of opposing crimping elements 59', 63' that contact one another at a compression point 89, the rope 51 is cut or severed and a sealed end is formed. As the rope 51 continues to be advanced by the rotation of the chains 71, 73, the next pair of opposing crimping elements 59", 63" approach one another. As the opposing crimping elements 59", 63" approach one another, at least some of the inner material 27S (e.g., emulsion) in the rope 51 that is located between the crimping elements 59", 63" is displaced to the right as seen with reference to the illustration in FIG. 14. This displaced inner material would tend to apply a force to the just sealed edge formed by the crimping elements 59', 63'. However, by virtue of the construction of the crimping apparatus. shown in FIGS. 13 and 14, as the next pair of crimping elements 59", 63" approach one another to crimp the rope 51, the crimping elements 59', 63' remain in contact with one another as they move through the nip region. These crimping elements 59', 63' provide support for the just formed sealed region and thus prevent the inner material that is displaced by the next pair of crimping elements 59", 63" from being squeezed outwardly past the first point 89 in a manner that would tend to break or otherwise damage the just formed seal. Thus, during crimping and cutting of the rope of edible product into individual products, pressure is maintained on the leading end of the product as the trailing end of the product is crimped and severed.

The crimping devices 103, 105 can be appropriately configured and sized depending upon the size of the edible products or treats 23 that are to be produced, as well as the number of ropes 51 of edible product that are to be processed simultaneously. In a manner similar to that noted above, the crimping apparatus shown in FIGS. 13 and 14 can be used to produce edible products or treats 23 from a single continuous rope 51 of edible product, or can be used to form edible products or treats 23 from several ropes 51 of edible product at the same time.

The crimping devices 103, 105 shown in FIGS. 15 and 16 can be made of tool steel coated with a TEFLON™ based material or other non-stick coating to prevent the crimping elements 59, 63 from sticking to the rope 51 of edible product during the crimping process. If the crimping elements are formed separate from the respective attachment portions, tool steel coated with a TEFLON™ based material or other non-stick coating can be used to fabricate the crimping elements, with the attachment portions being made of the same or a different material.

By way of example, the crimping devices 103, 105 may have a width W of approximately 7" (17 cm) wide, with through holes 115 centered at ⅜" (1 cm) from each end and at 1 ⅝" (4 cm) from each end for attachment to four separate chains. The attachment may have a length L of approximately 1 ¼", with the crimping elements 59, 63 being half-circles each having a radius of curvature of 3/16" (0.5 cm), and with the centers of the two crimping elements 59, 63 being spaced 5/16" (0.8 cm) from the side edges of the attachment and ⅝" (1.6 cm) from each other. The attachment portion 60, 64 may have a thickness of approximately 0.325" from the bottom to the flat surface 67, 73, and a thickness of approximately 0.510" from the bottom to the tops of the crimping elements 59, 63.

From a commercial standpoint, it is preferable to be able to consistently form pillow-shaped edible products or treats 23 that each have the same size and shape. This requires that the endmost point 85 on the one crimping element 63 be almost precisely aligned with the endmost point 87 on the opposing crimping element 59. However, due to play in the chains 71, 73 and the relatively high speed at which the crimping apparatus is operated, exact alignment of the endmost points on the opposing crimping elements is difficult to achieve. The crimping apparatus of the present invention is thus provided with an alignment mechanism that properly aligns the opposing crimping elements 59, 63 on the crimping devices 103, 105 as they approach one another and come into contact with each other. As seen in FIGS. 15 and 16, this alignment mechanism can take the form of a pair of alignment bars 117 provided on the crimping device 105. The alignment bars 117 are preferably in the shape of a cylindrical rod. The alignment bars 117 are preferably secured to the opposite ends of the crimping device 105 such as by welding and are located between the two crimping elements 63, 63. The alignment bar 117 extends beyond the endmost point 85 of the two crimping elements 59, 63. By locating the alignment bars 117 at the opposite ends of the crimping device as shown in FIG. 15, the alignment bars 117 do not interfere with the crimping of the rope of edible product that takes place between the alignment bars 117. While FIG. 15 shows the crimping device being provided with a pair of alignment bars 117, it is possible to provide only a single alignment bar 117 at one end of the crimping device 105, although a pair of alignment bars has been found to provide better performance. The alignment bar(s) 117 can be provided on the crimping devices 105 on the lower chain 71, or on the crimping devices 103 on the upper chain 73. Also, the alignment bar(s) 117 can be provided on every crimping device 105 on the lower chain 71 or on every crimping device 103 on the upper chain 73. Alternatively, the alignment bar(s) 117 can be provided on only some of the crimping devices 103, 105.

During operation of the crimping apparatus shown in FIGS. 13 and 14, as the opposing crimping devices 103, 105 move into opposing relation to one another, the alignment bar(s) 117 on the one crimping device 105 fits between the two crimping elements 59, 59 on the opposing crimping device 103 in the manner shown in FIG. 16. This advantageously causes the endmost points 85 of the crimping elements 63 on the one crimping device 105 to be aligned with the endmost points 87 of the crimping elements 59, 59 on the other crimping device 103. The alignment bars 117 are preferably circular in cross section, particularly when the crimping elements 59, 63 possess a half-circular shape, because such a circular cross-sectional shape for the alignment bars 117 easily nests with the crimping elements 59, 63. Of course, alignment bars 117 having other shapes can also be used.

As described above, and illustrated in FIGS. 2 and 3, the nozzle 44 of the manifold through which the outer cover material (e.g., the dough-like outer cover) and the inner material (e.g., emulsion) are coextruded includes the insert 52 having a generally oval-shaped opening and the pin 46 also having a generally oval-shaped configuration. The elongated rope 51 of edible product 51 that is extruded from the manifold thus possesses a generally oval shape. As a result, the elongated rope 51 of edible product possesses a smaller dimension in the direction in which the rope of edible product is subsequently crimped. That is, when the rope 51 of edible product is subsequently crimped, the rope is crimped in a direction parallel to the smaller dimension of the oval shaped rope. This means that a smaller dimension of the inner emulsion needs to be crimped than would otherwise be the case with a differently shaped product (e.g., a circular shaped rope of product). This thus reduces the stress on the dough at the center of the piece during crimping which is advantageous in helping to maintain the seals formed during crimping. This is because, as compared to a circular shaped rope of edible product, the dough-like outer cover does not need to be stretched or crimped as much.

Another version of the chain crimping apparatus 353 according to the present invention is shown in FIG. 19. This embodiment of the crimping apparatus 353 differs from that shown in FIG. 13 in several respects. First, rather than being horizontally arranged as shown in FIG. 13, the crimping apparatus 353 shown in FIG. 19 is diagonally oriented. The crimping apparatus 353 can be oriented at an angle of about 45°–60° to the horizontal. This diagonal orientation is advantageous because it allows the direction of travel of the crimping elements to more closely match the direction of flow of the rope of edible product 51 that is extruded from the manifold as seen in FIG. 19. The rope 51 of edible product that is extruded from the nozzle of the manifold can thus be fed directly into the compression point at which the opposing pairs of crimping devices 103, 105 confront one another. Thus, unlike the horizontally arranged crimping apparatus shown in FIG. 13, it is not necessary to make the lower chain 73 of the crimping apparatus 353 shown in FIG. 19 longer than the upper chain 71 for purposes of providing a flat receiving area on which the rope 51 of edible product is laid prior to entering the nip between the opposing pairs of confronting crimping devices 103, 105. Rather, the upper and lower chains 71, 73 of the crimping apparatus shown in FIG. 19 can be made identical in length. This is advantageous from a manufacturing standpoint. Further, from an operational stand point, the two chains 71, 73 can be driven at the same speed which simplifies the operation of the apparatus. In all other respects, the crimping apparatus shown in FIG. 19 is similar in structure and operation to the chain crimping apparatus described above and shown in FIGS. 13–16.

Another embodiment of the chain crimping apparatus according to the present invention is shown in FIG. 20. The chain crimping apparatus 453 according to this embodiment of the invention is vertically arranged. As mentioned above, the rope 51 of edible product extruded from the nozzle of the manifold is rather flexible and pliable, and thus tends to curve downward as it exits the manifold nozzle. Thus, the vertical orientation of the crimping apparatus 453 shown in FIG. 20 is perhaps best suited to receiving the rope 51 of edible product as the rope 51 exits the nozzle. As in the case of the diagonally oriented crimping apparatus shown in FIG. 19, the vertical orientation of the crimping apparatus shown in FIG. 20 does not require that one of the chains be longer than the other. This thus provides advantages similar to those described above in that the manufacture and operation of the apparatus are simplified. As shown in FIG. 20, a conveyor 452 can be provided to receive the continuous rope of edible product 51 and convey the rope of edible product 51 to the crimping apparatus 453.

In the version of the crimping apparatus shown in FIG. 13, a suitable conveyor can be arranged at the end of the crimping apparatus opposite the end at which the rope of edible product 51 enters the crimping apparatus to transport the edible products to a cooler or drying station. Similarly, in the version of the crimping apparatus depicted in FIGS. 19 and 20, a suitable conveyor can be positioned below the crimping apparatus to receive the individual edible products and transport them to a cooler or drying station.

During operation of the various chain crimping apparatus of the present invention shown in FIGS. 13, 19 and 20, it is desirable to ensure that each set of opposing crimping/ elements 59, 63 contact one another in the nip to ensure that the rope 51 of edible product is separated into individual edible products or treats 23. If the rope 51 of edible product is not fully separated at each of the crimping locations, additional efforts will be necessary to completely separate the individual edible products or treats. To assist in facilitating reliable contact between each set of opposing crimping elements 59, 63 in the nip, a spring biased pressure plate arrangement 119 may be operatively associated with each of the rotatable chains 71, 73 as illustrated in FIG. 20. This spring biased pressure plate arrangement 119, which can be employed in connection with any of the chain crimping apparatus shown in FIGS. 13, 19 and 20, not only helps facilitate the contact between opposing crimping elements 59, 63, but also assists in providing sufficient pressure on the rope 51 as it passes throughout the compression point between the two chains 71, 73.

The pressure plate arrangement 119 shown in FIG. 20 includes a pair of plates 121 that are urged outwardly against the inner surface of each of the belt or chain arrangements 71, 73 by springs 123 or other suitable biasing devices such as compressible rubber blocks, hydraulic or pneumatic pistons, and the like. The springs 123 may be mounted on rods connecting the plates 121 as shown in FIG. 20. The rod can be provided with stops so that each of the springs 123 bears against one of the stops and one of the plates 121. A suitable mechanism such as rollers may be provided to facilitate sliding of the belt or chain arrangement relative to the plates 121.

FIG. 22 sets forth a table showing six different formulations for the dough-like outer cover material, identified as A–F, that have been found to be well suited for producing edible pet treats or products in accordance with the present invention while at the same time being palatable to cats. The FIG. 22 table also identifies ranges for each of the listed ingredients. The table shown in FIG. 23 sets forth an example of a formulation for the inner emulsion that has also been found to be well suited for producing edible pet treats or products in accordance with the present invention while at the same time being palatable to cats and helpful in facilitating hairball treatment. The listed formulas and ranges in FIGS. 22 and 23 are based on weight percentages.

All of the formulations for the dough-like outer material exhibit the common characteristic of possessing a moisture content of between 20% and 35% by weight, at least prior to cooking, and the formulations are selected to stabilize microbial growth. This stabilization of microbial growth is achieved through the use of a combination of humectants and texturing agents, pH control and chemical preservatives. In addition, the formulas for the dough-like outer material include a blend of other materials.

The humectants and texturing agents used in the various formulations include sugar, malt syrup, corn syrup, crystalline fructose, salt, potassium chloride, glycerin, and animal fat and grease. In addition, some of the products used in preparing the formulations include bone phosphate and calcium sulfate.

Phosphoric acid is added as an ingredient for pH control while sorbic acid, BHA, and potassium sorbate are added as chemical preservatives. Of course, some of the ingredients mentioned above also exhibit characteristics in categories other than those mentioned.

Several other characteristics considered important in preparing the formulations for the dough-type material include structural integrity, taste and color. The structural integrity of the dough-like material is preferably provided from sources of starch and protein that include soy flour, wheat gluten, pregel wheat flour, wheat feed flour, corn starch, soy protein concentrate and patent flour wheat. To achieve the desired taste in the product that will be attractive to cats, palatants are added to the formulation. These palatants can include dried egg, dried cheddar cheese, torula yeast, chicken skin meal, beef, liquid digest and animal fat and grease. To achieve the desired color in the dough-like material, titanium dioxide and Red 40 can be added.

In the case of the emulsion formulation, the ingredients comprising the formulation include active agents, palatants, emulsifiers, humectants, thickeners and preservatives. Active agents include petroleum jelly or mineral oil, at least one of which is typically always present in the emulsion or inner component. Examples of palatants include liquid digest, cat palatability enhancer and chicken stock, the latter two of which also tend possess thickening characteristics. Acacia gum can be used as an emulsifier, carboxymethyl cellulose can be used as a thickener, and potassium sorbate can be used as a preservative. Ingredients used as humectants include salt, glycerin and malt syrup, the latter of which also serves as an emulsifier.

The system of the present invention described above and illustrated in FIG. 1 has been found to be well suited for manufacturing products in accordance with the present invention. However, it has been discovered that in some instances, such as when large batches of the emulsion are being produced, the emulsion can actually be thinned rather than thickened as the emulsion is passed through the shear pump 247 by way of the recirculation line 251. That is, it has been found desirable to pass the emulsion through the shear pump 247 twice to achieve the desired degree of thickening. In relatively small batches of emulsion, when the emulsion is fed from the mixing tank 229 to the shear pump 247, from the shear pump 247 back to the mixing tank 229 by way of the recirculation line 251, and then from the mixing tank 229 through the shear pump 247 and then onto the use tank 255, the system set up is such that most all of the emulsion passes through the shear pump twice and relatively little emulsion actually passes through the shear pump more than twice. However, as the emulsion batch size increases, it has been found that the system set up is such that a relatively large part of the emulsion passes through the shear pump 247 more than twice and a small portion of the emulsion does not pass though the shear pump two times. This causes the emulsifier (e.g., carboxymethyl cellulose or CMC) to actually thin rather than thicken. Thus, in the case of relatively large batches of emulsion, it has been found desirable to slightly modify the system illustrated in FIG. 1 in the manner shown in FIG. 25.

Figure 25:
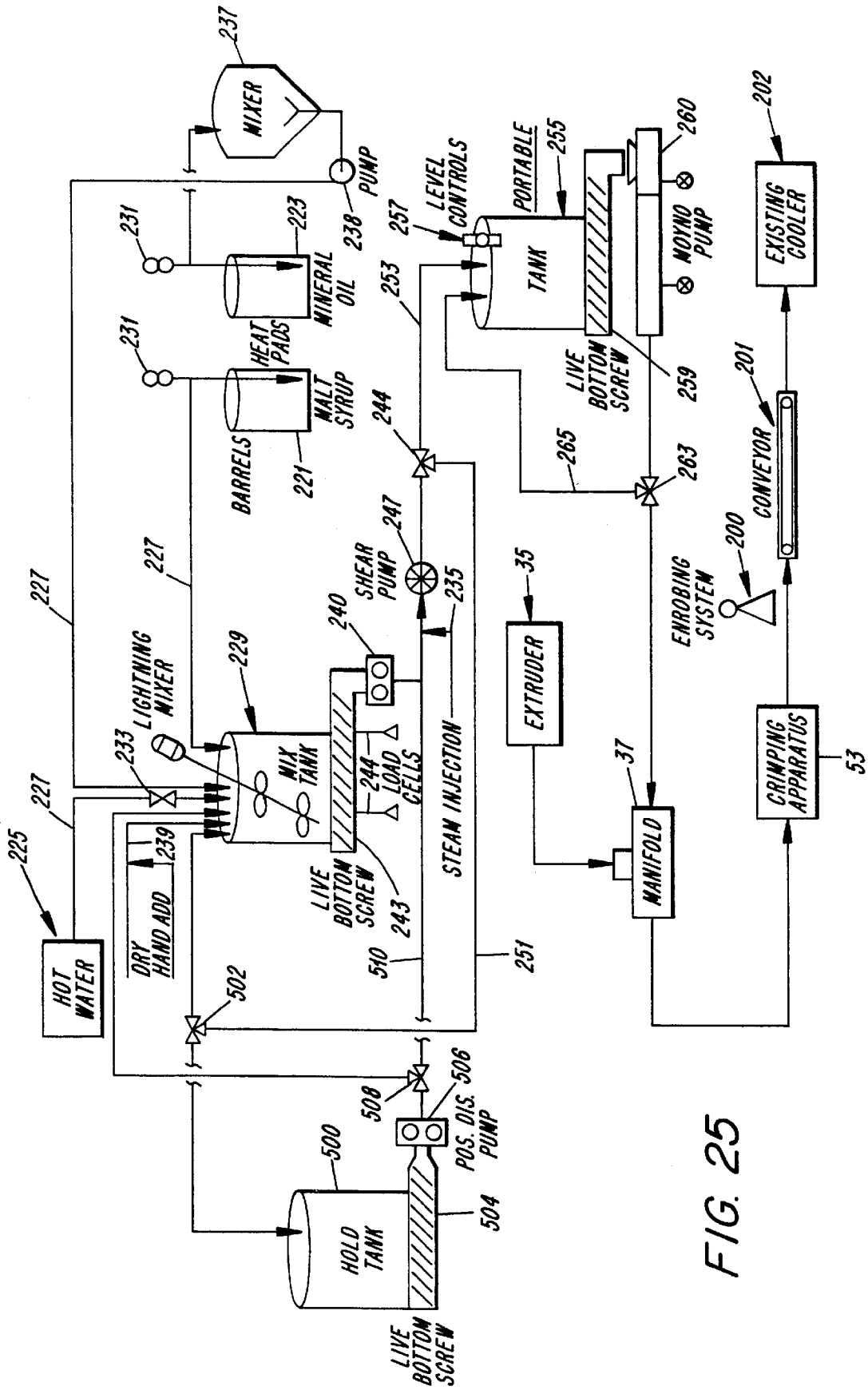
FIG. 25 is a schematic illustration similar to FIG. 1 showing a slightly modified version of the system involving the use of a hold tank for the emulsion.

As shown in FIG. 25, a hold tank 500 is provided between the shear pump 247 and the mixing tank 229. The recirculation line 251 is connected to a valve 502 that allows the emulsion passing through the recirculation line 251 to be directed either back to the mixing tank 229 or into the holding tank 500. The bottom of the hold tank 500 communicates with a live bottom screw or rotating auger 504 which conveys the emulsion to a positive displacement pump 506. The positive displacement pump 506 pumps the emulsion to a valve 508 that can direct the emulsion either back into the mixing tank 229 or along a conduit 510 that communicates with the conduit extending from the positive displacement pump 240 to the shear pump 247. The hold tank 500 allows the emulsion to be held without being recirculated back through the mixing tank and the shear pump until all of the emulsion has been emptied from the mixing tank 229. That is, all of the emulsion in the mixing tank 229 can be passed through the shear pump 247 a first time and then held in the hold tank 500. After all of the emulsion has been collected in the hold tank 500, the emulsion can then be directed back through the shear pump 247, either directly or by way of the mixing tank 229. This thus ensures that no portion or substantially no portion of the emulsion passes through the shear pump 247 more than the desired number of times (e.g., twice).

Set forth below is a brief summary of the emulsion preparation procedure that has been found to be particularly useful when using the system shown in FIG. 25. First, mineral oil from the mineral oil source 223 is pumped into the high speed mixer 237 (e.g., Breddo mixer) which mixes and heats the mineral oil. The high speed mixer is preferably operated for a period of time necessary to raise the temperature of the mineral oil to a temperature of about 150° F. This provides a desired degree of thickening of the emulsion. As the high speed mixer is operating, malt syrup which is preferably preheated as described above is pumped into the mixing tank 229, with the amount of weight of malt syrup introduced into the mixing tank 229 being determined from the load cells 244. The mixer in the mixing tank 229 is then started and the system is set to recycle, with the positive displacement pump 240 being turned on also. The shear pump 247 is then turned on so that as the malt syrup is conveyed through the shear pump 247 and back to the mixing tank 229 by way of the recirculation line 251, the malt syrup becomes heated. The malt syrup is preferably heated to a temperature on the order of about 130° F.–140° F. It has been found that this provides a desired degree of thickening in the final emulsion.

The water soluble dry ingredients are then mixed in approximately 10 pounds of hot water until they are dissolved. This aids in the mixing process. This water mixture with the dissolved ingredients is then added to the mixing tank. The agitator in the mixing tank 229 can then be slowed down, and the emulsifier (e.g., acacia gum or gum arabic) directly added to the recycle stream. This addition of the gum to the recycle stream facilitates mixing. The agitator in the mixing tank can then once again be speeded up to aid the mixing process. The mixing of the emulsifier gum with the other ingredients in the mixing tank is performed preferably for at least about 30 minutes as it has been found that this mixing time is important to accomplish the hydration of the emulsifier (e.g., acacia gum or gum arabic) that is necessary before it can work as an emulsifier.

Once the mineral oil being mixed and heated in the high speed mixer 237 has reached a temperature of about 150° F., the remainder of the dry ingredients forming the emulsion are added to the mineral oil and mixed. This aids in the dispersion of the dry ingredients and reduces water absorption. The shear pump 247 is then turned off so as not to excessively heat or shear the thickener (e.g., CMC).

Approximately one-half of the thickener (e.g., CMC) is then added to the mixing tank directly to the recycle stream. A portion of the mineral oil mixture (e.g., one-eighth) is then added to the mixing tank 229, with the mineral oil being added slowly to prevent separation. Similar portions of the mineral oil mixture are added until approximately one-half of the mineral oil mixture has been added. Once the oil has been incorporated into the mixture, which can be determined by visual inspection, the remainder of the thickener (e.g., CMC) is then added directly to the recycle stream. It has been found that adding the CMC in at least two separate batches is useful in preventing the emulsion from becoming excessively thick. The remainder of the mineral oil mixture is then added, once again in smaller batches as described above. Here, the high speed mixer 237 can be briefly turned on to mix the solid material in the mineral oil and ensure that the mixture remains mixed.

The shear pump 247 is then turned on and steam injection by way of the steam injector 235 is started. This steam injection continues until the temperature of the batch has increased by about 10° F. This temperature increase corresponds to the amount of formula water that is still left to be added to the formulation. To the extent additional water is needed, a higher temperature increase can be produced. The mixing tank 229 is then operated at maximum agitator speed. The emulsion in the mixing tank 229 is then transferred to the hold tank 500 through operation of the valve 502 while the shear pump 247 is operating. The valve can be adjusted so that the back pressure is no lower than when the system is in recycle, as it has been found that the shear pump works better with some back pressure on the pump. Once all of the emulsion has reached the hold tank 500, the shear pump 247 is turned off and the batch of emulsion is transferred from the hold tank 500 to the mixing tank 229 by directing the flow through the valve 508. The shear pump 247 can then be restarted, with the emulsion in the mixing tank 229 passing through the shear pump and being directed to the use tank 255. Instead of conveying the emulsion in the hold tank 500 to the mixing tank 229 and then back through the shear pump 247, it is possible to transfer the emulsion batch from the hold tank 500 through the line 510 and the shear pump 247 and onward to the use tank 255 by appropriately setting the valve 508. In this way, the system shown in FIG. 25 ensures that the entire emulsion passes through the shear pump the desired number of times (e.g., twice) to achieve the desired degree of thickening, and that substantially none of the emulsion passes through the shear pump 247 more than twice. The operation of the system then proceeds in a manner similar to that described above in connection with the system shown in FIG. 1.

It is also to be noted that except for the use of the hold tank shown in FIG. 25, the emulsion preparation process described immediately above can also be used in connection with operation of the system shown in FIG. 1.

The present invention thus provides an edible product comprised of an edible inner component substantially completely encapsulated within an edible outer cover component that is sealed at opposite ends. The edible outer cover is cooked during the manufacturing process so that once the rope of edible product has been crimped and cut into individual products, no further cooking is necessary. The edible product has been described in the context of a pet treat or pet product containing a hairball treatment. In this context, the present invention is highly advantageous in that cats are able to receive a hairball treatment formulation containing mineral oil or petroleum jelly without the disadvantages and drawbacks discussed above and associated with other hairball treatment products such as discussed above. Of course, it is to be understood that the edible product can contain other inner components that are medicinal in nature or not. The present invention also provides a method and apparatus for making such an edible product that allows high-speed and high-output production. When the edible product is other than one containing a hairball treatment formulation, the edible inner component need not be an emulsion. The edible inner component should be fluid or semi-fluid in nature so that it flows under pressure and can be coextruded with the edible outer component in accordance with the present invention. The edible inner component can be a solution, dispersion or pure material.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. An edible pet product useful in treating hairballs in animals, comprising:
    a first edible material in the form of a hairball treatment formulation, the first edible material comprising an emulsion that includes malt syrup, the emulsion comprising an aqueous phase and an oil phase; and
    a second edible cover material different from the first material and surrounding the first material to encapsulate the hairball treatment formulation, the first and second materials being conveyed through an orifice with the first material located inside the second material.

2. The edible pet product as set forth in claim 1, wherein the emulsion includes at least one of mineral oil and petroleum jelly.

3. The edible pet product as set forth in claim 1, wherein the second material includes soy flour and wheat flour.

4. The edible pet product as set forth in claim 1, wherein a bottom side of the pet product is substantially flat.

5. The edible pet product as set forth in claim 4, wherein a top side of the pet product is rounded.

6. The edible pet product as set forth in claim 1, wherein a bottom side and a top side of the pet product are rounded, and includes ends that are crimped at a substantial center point of the pet product with respect to the bottom and top sides of the pet product.

7. The edible pet product as set forth in claim 1, wherein the hairball treatment emulsion forming the first material includes a water control ingredient.

8. The edible pet product as set forth in claim 1, wherein the hairball treatment emulsion forming the first material includes a preservative.

9. The edible pet product as set forth in claim 1, wherein the hairball treatment emulsion forming the first material includes a thickener.

10. An edible pet product comprising:
    an edible inner component comprised of an emulsion that includes malt syrup, the emulsion comprising an aqueous phase and an oil phase; and
    an edible outer cover component different in composition from the inner component and substantially completely encapsulating the inner component, and the outer component being sealed along two opposite ends, the outer and inner components being conveyed through an orifice with the inner component located inside the outer component.

11. The edible pet product as set forth in claim 10, wherein the seal on each end is located between top and bottom surfaces of the edible product.

12. The edible pet product as set forth in claim 10, wherein the seal on each end is located adjacent a bottom surface of the edible product.

13. The edible pet product as set forth in claim 10, wherein the emulsion forming the edible inner component includes a water control ingredient.

14. The edible pet product as set forth in claim 10, wherein the emulsion forming the inner component includes a preservative.

15. The edible pet product as set forth in claim 10, wherein the emulsion forming the inner component includes a thickener.

16. The edible pet product as set forth in claim 10, wherein the outer cover component is comprised of soy flour and wheat flour.

17. The edible pet product as set forth in claim 10, wherein the emulsion forming the inner component also comprises mineral oil.

18. The edible pet product as set forth in claim 17, wherein the oil is mineral oil.

19. The edible pet product as set forth in claim 10, wherein the emulsion forming the inner component is also comprised of at least one of mineral oil and petroleum jelly.

20. The edible pet product as set forth in claim 19, wherein the outer cover component is comprised of soy flour and wheat flour.

21. An edible pet product comprising:
    an edible inner component and an edible outer component having different compositions and conveyed through an orifice with the inner component located inside the outer component;
    the inner component comprising an emulsion containing malt syrup and petroleum jelly or mineral oil constituting a hairball treatment formulation, the emulsion comprising an aqueous phase and an oil phase; and
    the outer component completely encapsulating and surrounding the inner component to form an edible pet product, the pet product being crimped along two opposite ends so that the inner component is sealed within the outer component.

22. The edible pet product as set forth in claim 21, wherein the edible pet product is crimped at opposite ends at a location between top and bottom surfaces of the edible pet product.

23. The edible pet product as set forth in claim 21, wherein the edible pet product is crimped at opposite ends at a location adjacent a bottom surface of the edible product.

24. The edible pet product as set forth in claim 21, wherein the outer component is a dough material.

25. The edible pet product as set forth in claim 21, wherein the inner component is also comprised of a preservative.

26. The edible pet product as set forth in claim 21, wherein the outer cover component is comprised of soy flour and wheat flour.

27. The edible pet product as set forth in claim 21, wherein the inner comprised of the emulsion includes a water control ingredient.

28. The edible pet product as set forth in claim 21, wherein the inner comprised of the emulsion includes a thickener.

* * * * *